(12) United States Patent
Srivastava et al.

(10) Patent No.: US 11,910,455 B1
(45) Date of Patent: Feb. 20, 2024

(54) TECHNIQUES TO PROVIDE SPONSORED DATA FOR A USER EQUIPMENT IN A MOBILE NETWORK ENVIRONMENT

(71) Applicant: Cisco Technology, Inc., San Jose, CA (US)

(72) Inventors: Vimal Srivastava, Bangalore (IN); Srinath Gundavelli, San Jose, CA (US); Robert Michael Batz, Raleigh, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/886,953

(22) Filed: Aug. 12, 2022

(51) Int. Cl.
*H04W 76/34* (2018.01)
*H04L 67/141* (2022.01)
(Continued)

(52) U.S. Cl.
CPC ......... *H04W 76/15* (2018.02); *H04L 61/4511* (2022.05); *H04L 67/141* (2013.01); *H04W 76/34* (2018.02)

(58) Field of Classification Search
CPC ... H04W 76/15; H04W 76/34; H04L 61/4511; H04L 67/141; H04L 67/14; H04L 67/142;
(Continued)

(56) References Cited

U.S. PATENT DOCUMENTS

2014/0094138 A1* 4/2014 Saker .................... H04M 15/80
455/406
2017/0078404 A1* 3/2017 Ren ........................ H04L 67/146
(Continued)

FOREIGN PATENT DOCUMENTS

WO 2012129992 A1 10/2012
WO 2016206354 A1 12/2016
(Continued)

OTHER PUBLICATIONS

"3rd Generation Partnership Project; Technical Specification Group Core Network and Terminals; Policy and Charging Control (PCC); Reference points (Release 17)," 3GPP TS 29.212 V17.2.0, Mar. 2022, 290 pages.

(Continued)

*Primary Examiner* — Alina A Boutah
(74) *Attorney, Agent, or Firm* — Edell, Shapiro & Finnan, LLC

(57) ABSTRACT

Presented herein are techniques to provide sponsored data to a user equipment in a mobile network environment. For example, techniques provided herein may provide for the ability to enhance sponsored data connectivity by enabling a mobile network to facilitate sponsorship of a network slice as part of sponsored data connectivity in which the network slice can provide traffic flow specific Service Level Agreement (SLA) connectivity and treatment. In one example, a method is provided that includes determining, via a first session of a user equipment (UE), that the UE seeks to access content in which financial sponsorship for accessing the content by the UE is to be provided by a sponsoring entity in which the first session involves a first network slice and enabling the UE to establish a second session to access the content in which the second session involves a second network slice.

20 Claims, 9 Drawing Sheets

(51) Int. Cl.
*H04W 76/15* (2018.01)
*H04L 61/4511* (2022.01)

(58) Field of Classification Search
CPC ... H04L 67/143; H04L 67/145; H04L 67/146; H04L 67/147; H04L 67/148; H04L 47/70; H04L 67/50; H04L 67/53; H04L 67/567; H04L 67/63
See application file for complete search history.

(56) References Cited

U.S. PATENT DOCUMENTS

| | | | | |
|---|---|---|---|---|
| 2017/0230478 | A1* | 8/2017 | Huang | H04M 15/00 |
| 2017/0237609 | A1* | 8/2017 | Yin | H04L 41/12 |
| | | | | 709/222 |
| 2017/0279912 | A1 | 9/2017 | Zhang et al. | |
| 2018/0213038 | A1* | 7/2018 | Chung | H04L 12/1471 |
| 2019/0053104 | A1* | 2/2019 | Qiao | H04M 15/66 |
| 2020/0145876 | A1* | 5/2020 | Dao | H04W 28/06 |
| 2021/0122261 | A1* | 4/2021 | Qiao | H04W 4/40 |
| 2021/0352180 | A1* | 11/2021 | Xu | H04W 12/08 |
| 2021/0385724 | A1* | 12/2021 | Wang | H04L 41/40 |
| 2022/0022029 | A1* | 1/2022 | Di Girolamo | H04W 4/50 |
| 2022/0174757 | A1* | 6/2022 | Aravind | H04L 67/141 |
| 2022/0224553 | A1* | 7/2022 | Dauneria | H04M 15/51 |
| 2023/0080830 | A1* | 3/2023 | Fernandez Alonso | H04W 4/50 |
| 2023/0123249 | A1* | 4/2023 | He | H04W 76/10 |
| | | | | 370/329 |

FOREIGN PATENT DOCUMENTS

| | | | | |
|---|---|---|---|---|
| WO | 2017125698 | A1 | 7/2017 | |
| WO | WO-2020112480 | A1* | 6/2020 | H04L 67/16 |
| WO | WO-2022026482 | A1* | 2/2022 | |
| WO | WO-2023019057 | A2* | 2/2023 | |

OTHER PUBLICATIONS

"3rd Generation Partnership Project; Technical Specification Group Core Network and Terminals; 5G System; Access and Mobility Policy Control Service; Stage 3 (Release 17)," 3GPP TS 29.507 V17.7.0, Jun. 2022, 71 pages.

"3rd Generation Partnership Project; Technical Specification Group Core Network and Terminals; 5G System; Session Management Policy Control Service; Stage 3 (Release 17)," 3GPP TS 29.512 V17.7.0, Jun. 2022, 255 pages.

"3rd Generation Partnership Project; Technical Specification Group Core Network and Terminals; 5G System; UE Policy Control Service; Stage 3 (Release 17)," 3GPP TS 29.525 V17.7.0, Jun. 2022, 70 pages.

"3rd Generation Partnership Project; Technical Specification Group Core Network and Terminals; 5G System; Network Exposure Function Northbound APIs; Stage 3 (Release 17)," 3GPP TS 29.522 V17.6.0, Jun. 2022, 447 pages.

"3rd Generation Partnership Project; Technical Specification Group Services and System Aspects; Security architecture and procedures for 5G system (Release 17)," 3GPP TS 33.501 V17.6.0, Jun. 2022, 292 pages.

"3rd Generation Partnership Project; Technical Specification Group Services and System Aspects; System architecture for the 5G System (5GS); Stage 2 (Release 17)," 3GPP TS 23.501 V17.5.0, Jun. 2022, 568 pages.

"3rd Generation Partnership Project; Technical Specification Group Services and System Aspects; Policy and charging control framework for the 5G System (5GS); Stage 2 (Release 17)," 3GPP TS 23.503 V17.5.0, Jun. 2022, 148 pages.

"3rd Generation Partnership Project; Technical Specification Group Core Network and Terminals; Non-Access-Stratum (NAS) protocol for 5G System (5GS); Stage 3; (Release 17)," 3GPP TS 24.501 V17.7.1, Jun. 2022, 991 pages.

* cited by examiner

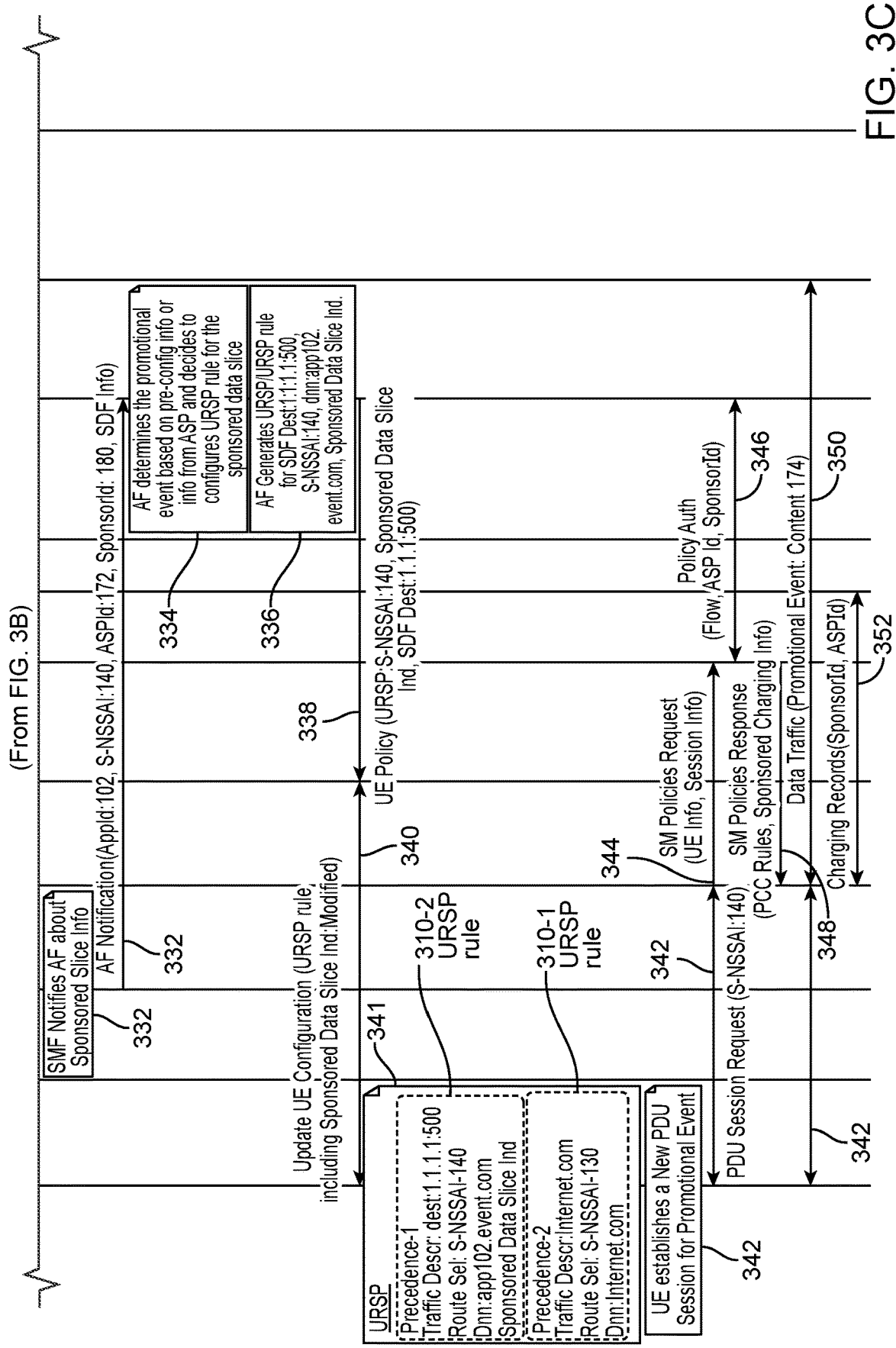

TECHNIQUES TO PROVIDE SPONSORED DATA FOR A USER EQUIPMENT IN A MOBILE NETWORK ENVIRONMENT

TECHNICAL FIELD

The present disclosure relates to network equipment and services.

BACKGROUND

Networking architectures have grown increasingly complex in communications environments, particularly mobile networking environments. In particular, different mobile network paradigms have been introduced involving different technologies and deployment environments, such as network slicing, private mobile networks, virtualized network functions, combinations thereof, and the like. With the introduction of new mobile network paradigms, there are significant challenges in managing network communications and connectivity for wireless mobile network devices that seek to obtain mobile network services.

BRIEF DESCRIPTION OF THE DRAWINGS

FIGS. 3A, 3B, and 3C are a message sequence diagram illustrating another call flow associated with providing sponsored data for a UE in a mobile network environment, according to an example embodiment.

DESCRIPTION OF EMBODIMENTS

Overview

Figure 1:
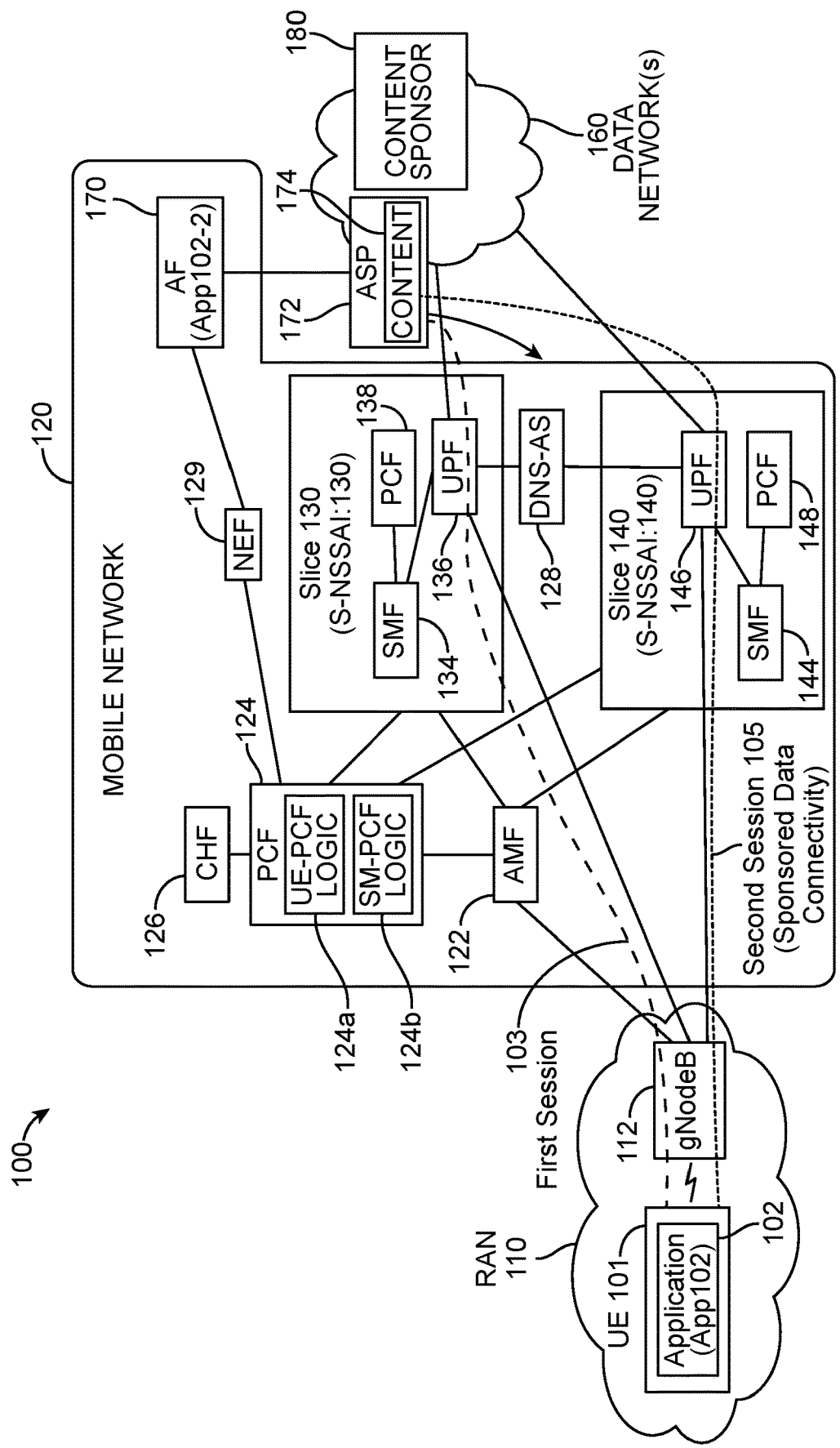
FIG. 1 is a block diagram of a system in which techniques may be implemented to provide sponsored data for a user equipment (UE) in a mobile network environment, according to an example embodiment.

Techniques provided herein may provide for the ability to enhance sponsored data connectivity by enabling a mobile network to facilitate sponsorship of a network slice as part of sponsored connectivity in which the network slice can provide traffic flow specific Service Level Agreement (SLA) connectivity and treatment.

In one embodiment, a method is provided that may include determining, via a first session of a user equipment, that the user equipment seeks to access content in which financial sponsorship for accessing the content by the user equipment is to be provided by a sponsoring entity, wherein the first session is provided via a first network slice; and based on the determining, triggering the user equipment to establish a second session to access the content, wherein the second session is provided via a second network slice that is different than the first network slice.

EXAMPLE EMBODIMENTS

As referred to herein, a wireless wide area (WWA) access network, such as a cellular/Third (3rd) Generation Partnership Project (3GPP) access network, may be characterized as a Radio Access Network (RAN) having radio nodes (also referred to herein as access network radios) such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG or NG) access networks, Radio Units (RUs) for disaggregated virtualized RAN (vRAN) architectures, and/or the like that provide a larger RAN coverage area as compared to the RAN coverages area typically provided by wireless local area (WLA) radio nodes/access network radios (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node/access network radio is often larger than the WLA RAN coverage area provided by a WLA radio node/access network radio. Additionally, a WWA RAN radio node can typically provide radio access connectivity for a larger number of devices as compared to a WLA RAN radio node/access network radio. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., wireless devices, users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances. Cisco is a registered trademark of Cisco Technology, Inc.

Additionally, with reference to various examples discussed herein, network slicing is a concept of 3GPP 5G system (5GS)/nG architectures. A network slice is a logical end-to-end network that can be dynamically created and may include any combination of 3GPP mobile network functions/functionality. Generally, a network slice, also referred to generally as a 'slice', 'instantiated slice', or 'slice instance', can refer to a group or set of Virtualized Network Functions (VNFs) that are configured to facilitate a certain mobile network service or group of mobile network services.

A given user equipment (UE) may have access to multiple network slices over the same Radio Access Network (RAN). Each network slice may serve a particular service type with an agreed upon Service-level Agreement (SLA). To provide mobile network services associated with a given network slice type, a slice of the given slice type can be instantiated in which the instantiated slice for the slice type can provide certain mobile network services to a number of UEs.

A network slice instance within a Public Land Mobile Network (PLMN) can include any combination of nG RAN and/or core network control plane and user plane network functions. Per-3GPP Technical Specification (TS) 23.501, a Single-Network Slice Selection Assistance Information (S-NSSAI) indicator can be used to uniquely identify a slice in which an S-NSSAI includes a Slice/Service Type (SST) indication, which indicates the expected slice behavior for a slice requested by a UE in terms of expected features and services, and, optionally, can include a Slice Differentiator (SD), which can be used to differentiate among multiple slices of a same SST.

Different types of network slices (network slice types) can be configured for a mobile network such that each slice type can provide certain mobile network services. As referred to herein and in the claims, the terms 'slice', 'slice instance', 'network slice', and/or variations thereof may be used interchangeably to refer to a type of network slice that can be instantiated (e.g., configured, created, validated, operated, managed, etc.) within a mobile network to provide one or more mobile network services for one or more user equipment. Various VNFs that can be configured for a slice type in accordance with techniques described herein can include any combination of 3GPP Fourth Generation/Long Term Evolution (4G/LTE) VNFs, 5G VNFs, 6G VNFs, etc., as may be prescribed, at least in part, by 3GPP standards.

Various example network slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

For various examples herein, a network slice requested by a wireless device (e.g., a UE) can be referenced generally as a number or value, formatted as "S-NSSAI: #" in various examples herein, in which the number (#) can correspond to an SST value and, optionally, an SD, in accordance with 3GPP specifications. It is to be understood that any SST values may be configured by a mobile network operator for other slice types. Additionally, slice type values used for various examples/embodiments described herein may differ from standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

Different applications (e.g., social networking applications, audio/video streaming applications, enterprise applications, collaboration applications, etc.) operating via a UE may utilize different network slice types. The type of network slice to be utilized for a particular application, as well as other network and/or application-specific information associated with network connectivity for a UE for the particular application can be signaled to a UE via one or more URSPs, as discussed in further detail herein.

Generally, a URSP is a policy element in the 3GPP 5G system architecture which allows a UE to make the determination on how the application traffic for a given application is to be routed via a mobile network. Generally, as currently prescribed by Release 17 of 3GPP Technical Specification (TS) 23.503, Version 17.5.0 (released June 2022), a URSP includes a number of rules (also referred to interchangeably herein as 'URSP rules') in which each rule includes a rule precedence value, a traffic descriptor portion, and a route selection portion. The rule precedence value can be used by a UE to determine an order for enforcing different URSP rules that may be provisioned for the UE.

The traffic descriptor portion of a URSP rule can include descriptors/information that can be used by a UE to identify traffic for a given application in which such descriptors/information may include, but not be limited to an application identifier (ID) for an application, Internet Protocol (IP) descriptors for traffic associated with the application (e.g., source/destination address, source/destination port, etc.), domain descriptors (e.g., Fully Qualified Domain Name(s) (FQDN(s) or other criteria/descriptors) that can be used to match domain names for traffic associated with the application, Data Network Name (DNN) information, etc., as may be prescribed by 3GPP standards.

The route selection portion of a URSP rule can include descriptors/information that can be used by a UE for communicating application traffic, such as a Session and Service Continuity (SSC) mode to utilize communications involving application, a network slice to utilize for communications involving an application, a Protocol Data Unit (PDU) session type to utilize for communications involving an application, an access type (e.g., 3GPP access, non-3GPP access, or combinations thereof) to utilize for communications involving an application, DNN selection information, etc., as may be prescribed by 3GPP standards.

In current 3GPP 5G system architectures, a URSP can be delivered to a UE through registration with a mobile network. The definition of URSP policy elements continues to evolve with richer semantics such that URSPs continue to be augmented with new elements/information that can enhance user experience for different applications that may be operating via a UE.

In current 3GPP mobile network architectures, UE-PCF logic delivers a URSP policy (also referred to herein interchangeably as a 'URSP') to a UE using a standards-based 'MANAGE UE POLICY COMMAND' message. The UE, as part of its registration to a mobile network, provides information to the network indicating its supported operating system (OS) version via a standards-based 'UE STATE INDICATION' message that allows the UE-PCF logic to generate a URSP policy that is specific to the UE's OS version and also considers a subscription policy for the UE (e.g., for the user operating the UE).

Support for sponsored data connectivity was added to the 3GPP evolved packet system (EPS) architecture in Release 10 of 3GPP standards. The primary motivation for adding this capability was to support mobile data usage for transactional types of applications. For example, consider a scenario in which a user of a particular UE purchases an electronic (eBook), a game from an online store, views a movie trailer prior to making the purchasing decision, accesses essential health information from a ministry of health website, etc. In all of these examples, the consumer is not paying for the data-usage, rather the content provider that provides the content is paying for the data usage.

Operations involving providing monetary payment (using any form of currency, guaranty, and/or any other payment mechanisms, non-digital and/or digital) for content and/or any payment-related interactions that may be utilized to pay for content provided to a UE is referred to herein as 'financial sponsorship'. Financial sponsorship can be provided by a content sponsor (e.g., business, educational institution, government entity, enterprise entity, etc.), which could be the entity that is providing/delivering content to a user or could be any other entity that is providing financial sponsorship for providing/delivering content to a user. It is to be understood that financial sponsorship can be assumed by/for, delegated to/from, or otherwise by any entity, referred to herein as a 'sponsoring entity', or combination of sponsoring entities, such as a content provider, an application service provider (ASP), a content sponsor, a mobile network subscriber (e.g., a user operating a UE), an identity provider (e.g., for federation-based networking architectures, such as OpenRoaming, etc.), an enterprise entity associated with a network subscriber, combinations thereof, and/or the like.

For the 3GPP prescribed sponsored data connectivity model, dynamic data usage provided by a sponsor (separate from a mobile network operator) allows the mobile network operator to monetize the data usage of its own subscribers (some with limited data plans) by charging a content provider directly for certain content that may be provided to the subscribers from the content provider, such that financial sponsorship for such content is provided (to the mobile network operator) by the content provider. Many mobile network operators have launched sponsored data services enabling sponsored data connectivity.

In current sponsored data service implementations, an application function (AF) managed/operated by a given ASP can provide a sponsor's information to the Policy Control Function (PCF) of a mobile network based on such information being provided to the AF by the ASP. The sponsor's information can include an ASP identifier (ASPId) for the ASP, a Sponsor (ID) for the sponsor, and potentially volume/time threshold information that can indicate a data volume (amount of content/data in megabytes (MB), gigabytes (GB), etc.) that is to be paid for by the sponsor and/or any time limit threshold information that may be associated with the financial sponsorship for the content (e.g., only on a certain day, only within a certain time range, only on weekdays after 8:00 PM, etc.).

The PCF can use this information to update one or more policies (e.g., for one or more subscribers) in the Session Management Function (SMF) of the mobile network. As a result, data flows identified by a corresponding service data flow (SDF)/Application identifier (AppId) are not charged to the subscriber, but rather to the sponsor, when charging records are generated by the SMF (and sent to a Charging Function (CHF) in the mobile network. When the volume/time thresholds satisfy certain corresponding threshold(s), the SMF notifies the PCF and PCF can update the polices, which may result in terminating the sponsored data flows and notifying the AF about the same.

There are certain limitations with this standards-based approach in which the AF notifies the mobile network regarding flow metadata for exclusion from a subscriber's charging records. For example, a user operating a UE having a Protocol Data Unit (PDU) session on eMBB slice that may be accessing streaming video content via an application communicating with an AF/ASP may encounter a link for an advertisement that is sponsored by a theme park operator regarding a new theme park. In this example, when the user clicks the link, the content is accessed by the user's UE over the current default eMBB slice with no awareness by the operator or the content sponsor regarding the application experience to be provided for that sponsored content; the UE also has no awareness regarding route selection policies to be applied for that application. In such scenario, the network slice, Quality of Service, etc. used for accessing such content may or may not provide the appropriate service experience for the user, and in some cases may leave the user with a bad experience.

In current 3GPP standards-based sponsored data systems, there is no mechanism for bringing user experience into the equation for providing sponsored data connectivity. With support for network slicing in Release 17, slice specific configurations can be provided in the mobile core network and specific scheduling configurations can also be provided in the RAN. For example, an application accessed over a URLLC network slice can provide a specific network behavior with a certain level of service-assurance, compared to when the same application is accessed over an eMBB slice.

Therefore, the mere marking of flows for charging exclusion may not be sufficient with regard to influencing application experience by a user in sponsored data scenarios such that the standards-based approach results in a user potentially not obtaining the full experience as desired by an ASP or other sponsoring entity that is providing financial sponsorship for certain content (e.g., to promote a movie, play a game, etc.) and wants the user to experience the full potential of the content (e.g., audio/visual content, etc.).

Accordingly, there is value in enabling access to sponsored data/content in a manner that can provide a specific application experience and assurance, as prescribed by the sponsor of such content. In particular, it would be advantageous if the trigger from an AF for sponsored data/content enablement could include the elements for application characterization in order for the mobile network/mobile network operator to enable network elements and a given UE to provide a desired application experience for the sponsored content, potentially for a specific duration of time. Thus, the mobile network element and UE can be bounded using techniques as discussed for embodiments herein in order to enable a desired application experience.

As discussed for embodiments herein, at least two techniques may be utilized to enable sponsored data for a UE in a mobile network environment with new capabilities for supporting application experience and assurance (e.g., through an SLA associated with a given network slice/slice type). Through the first technique, a trigger for sponsored data enablement can be based on an AF trigger that can be initiated upon an end user (UE) signing-up for or otherwise initiating a request for sponsored content. Through the second technique, a trigger for sponsored data enablement can based on intercepting a Domain Name System (DNS) query from a UE, such that when a user of the UE accesses or otherwise initiates access to a sponsored data Uniform Resource Identifier (URI) (e.g., 'www.sponsor.com/content'), the mobile network or, more specifically, a User Plane Function (UPF) of a mobile network slice, can detect the sponsored data link/URI and activate steps for sponsored data enablement that can provide/meet a particular application experience and assurance.

Broadly, embodiments herein can provide for enhancing extensions to sponsored data connectivity triggers sent from an AF to a PCF/UE-PCF logic to include service parameters that can enable the mobile network and a UE seeking to obtain certain sponsored content to facilitate sponsored data connectivity through which an application experience and assurance can be provided to the UE that is to obtain the sponsored content. UE-PCF logic can be enhanced in accordance with embodiments herein in order to trigger SM-PCF logic to deliver an updated URSP/URSP rule to the UE to enable the UE to initiate connectivity to a particular network slice in order to obtain sponsored content. In some instances, intercept logic can be configured for a UPF such that the UPF can identify/detect a sponsored content URI in order to trigger sending/delivering an updated URSP/URSP rule to a UE to enable the UE to initiate connectivity to a particular network slice in order to obtain sponsored content. A UE obtaining an updated URSP/URSP rule can apply the updated URSP rule to initiate connectivity to a particular network slice in order to obtain sponsored content, in accordance with various embodiments herein.

Accordingly, embodiments herein provide for the ability to enhance sponsored data connectivity by enabling a mobile network to facilitate sponsorship for a network slice as part of sponsored connectivity in which the network slice can provide traffic flow specific SLA connectivity and treatment such that sponsored content can be accessed/obtained by a UE in a manner that meets an application experience and assurance as desired by a sponsor of the content (e.g., sponsoring entity) that is providing financial sponsorship for the content to be accessed/obtained by the UE.

Referring to FIG. 1, FIG. 1 is a block diagram of a system 100 in which techniques may be implemented to provide sponsored data for a UE in a mobile network environment, according to an example embodiment. As shown in FIG. 1, system 100 may include a UE 101, a Radio Access Network (RAN) 110, a mobile network 120, and one or more data networks 160. RAN 110 may be implemented as any 3GPP 5G/next generation (nG) RAN and may include any number of gNodeBs (sometimes referred to as a 'gNBs'), such as a gNodeB 112. It is to be understood that any number of UEs may be present in system 100. FIG. 1 illustrates a content sponsor 180 that provides financial sponsorship for certain data or content 174 made accessible to one or more UEs via an application service provider (ASP) 172.

In at least one embodiment, mobile network 120 may be representative of a 5G mobile core (5GC) network or 5GS and may include an Access and Mobility Management Function (AMF) 122, a Policy Control Function (PCF) 124, a Charging Function (CHF) 126, a Domain Name System as an Authoritative Source (DNS-AS) server, referred to herein as DNS-AS 128, and a Network Exposure Function (NEF) 129, and an application function (AF) 170. PCF 124 may provide different logical functionality via UE-PCF logic 124a and Session Management (SM)-PCF logic 124b.

Mobile network 120 may also include a number of network slices instantiated for corresponding slice types provided by mobile network 120 for various services (e.g., general/default services, mIoT services, URLLC services, etc.) that may be provided for one or more PDU sessions for UE 101 (or any other UE that may be present in mobile network 120). For example, mobile network 120 may include a network slice 130 and in which each slice may be configured to provide services for each of a corresponding slice type and may be identified by a corresponding S-NS-SAI. Each network slice may include a corresponding Session Management Function (SMF), a corresponding User Plane Function (UPF), and a corresponding PCF.

In at least one embodiment, network slice 130 may include an SMF 134, a UPF 136, and a PCF 138 and may be referred to interchangeably herein as 'S-NSSAI: 130'. Also shown in FIG. 1, in at least one embodiment, network slice 140 may include an SMF 144, a UPF 146, and a PCF 148 and may be referred to interchangeably herein as 'S-NSSAI: 140'.

The VNFs (i.e., SMF 134 and 144, UPF 136 and 146, and PCF 138 and 148) for the network slices 130 and 140 of mobile network 120 are shown for illustrative purposes only and are not meant to limit the broad scope of the present disclosure. It is to be understood that any VNFs may be provided for network slices (slice instances) as may be prescribed by 3GPP standards, GSMA standards, etc. for various mobile network services that may be provided by various slice types. Further, in some instances multiple SMFs and/or UPFs may be provided for one or more of network slices 130 and/or 140.

Further, it is to be understood that other VNFs/network elements may be configured for mobile network 120 for any combination of Third Generation (3G)/Fourth Generation (4G)/5G/6G/nG mobile network implementations, such as any combination of a Policy and Charging Rules Function (PCRF), a Network Repository Function (NRF) (sometimes referred to as a NF Repository Function), a Network Slice Selection Function (NSSF), a Unified Data Management (UDM) entity, a Unified Data Repository (UDR), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

Also shown in FIG. 1, system 100 may include any number of application functions (AFs), such as AF 170 managed/operated by an ASP 172 in which the AF 170/ASP 172 may manage/communicate with an application 102 (also referred to herein as 'App102') that may be installed/operated on UE 101. In various embodiments, application 102 may be implemented as any combination of applications/application logic that may be installed/operated on UE 101, such as social networking applications, shopping applications, audio/video streaming applications, enterprise applications, collaboration applications, weather applications, navigation applications, information applications, and/or any other applications now known or hereafter developed that may be installed/operated on a UE/wireless device/wired device/etc.

In various embodiments, the data network(s) 160 of FIG. 1 may include be any combination of the Internet, a gaming network, an IP IMS, an Ethernet data network (not shown), Ethernet switching system(s) (not shown), an enterprise network managed/operated by an enterprise entity, and/or the like. In some embodiments, ASP 172, and/or content sponsor 180 may be configured to operate in whole or in part via data network(s) 160.

RAN 110, via gNodeB 112, may interface with mobile network 120 via one or more wired and/or wireless interfaces. For example, gNodeB 112 may interface with AMF 122 and also with UPF 136 of network slice 130 and UPF 146 of network slice 140 in order to interact/communicate with any other elements of mobile network 120 and/or data network(s) 160, as well as any of AF 170, ASP 172, and/or content sponsor 180. RAN 110, via gNodeB 112, may also interface with UE 101 via one or more over-the-air Radio Frequency (RF) connections.

AMF 122 may further interface PCF 124 and one or more VNF(s) of each of network slice 130 and network slice 130 in accordance with 3GPP standards. PCF 124 may also interface CHF 126, NEF 129, and with one or more VNF(s) of each of network slice 130 and network slice 130 in accordance with 3GPP standards. It is to be understood that CHF 126 may further interface with other network elements of mobile network 120 and of each network slice 130 and 140 in accordance with 3GPP standards. NEF 129 may further interface with AF 170, which may further interface with ASP 172. VNFs for each of network slice 130 and 140 may interface with each in accordance with 3GPP standards and each corresponding UPF 136 and 146 of each corresponding network slice 130 and 140 may further interface with data network(s) 160 and with DNS-AS 128

The various interfaces shown in FIG. 1 are provided for illustrative purposes only and are not meant to limit the broad scope of the present disclosure. It is to be understood that network connectivity/interfaces among any of UE 101, RAN 110, mobile network 120, and data network(s) 160, and any elements/logic/VNF associated therewith, may be provided in any manner/configuration in accordance with 3GPP standards to facilitate operations, communications, etc. as discussed for embodiments herein.

Generally, RAN 110 may include any combination of one or more 3GPP 5G/nG gNodeB or gNB, such as gNodeB 112 and/or 3GPP 4G/LTE evolved node Bs (eNodeBs or eNBs), not shown, to facilitate network connectivity between UEs (e.g., UE 101) and mobile network 120. A gNodeB/eNodeB, such as gNodeB 112, may implement WWA (e.g., cellular) air interface and, in some instances also a WLA (e.g., Wi-Fi®) air interface, for any combination of Radio Access Technology (RAT) types (sometimes referred to more generally as 'accesses') for RAN 110 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more UEs, such as UE 101, may utilize to connect to RAN 110 for one or more PDU sessions (e.g., voice, video, data, gaming, combinations thereof, etc.) with a mobile core network, such as mobile network 120.

Generally, the coverage area of a radio node/access network radio such as an eNodeB, gNodeB, etc. is typically referred to as a 'cell' in which one or more UEs may attach to the radio node/access network radio that serves the coverage area/cell. In various embodiments, the coverage area of a radio node/access network radio can be identified through any combination of a Tracking Area Identifier (TAI), Routing Area Identifier (RAI), and/or the like as prescribed by 3GPP standards, etc. In various embodiments, gNodeB 112 can be identified using cell descriptors such as cell identifiers (IDs) including, but not limited to, Physical Cell Identifiers (PCIs), E-UTRAN Cell Global Identifiers (ECGIs), New Radio Cell Global Identifiers (NCGIs), and/or the like.

A UE, such as UE 101, may be associated with any user, subscriber, employee, client, customer, electronic device, etc. wishing to initiate a flow in system 100 and may be inclusive of any device that initiates a communication in system 100, such as a UE, a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. Thus, a UE, such as UE 101 may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes/access network radios of a RAN, such as RAN 110, for one or more sessions with a mobile core network, such as mobile network 120.

In addition to various operations discussed for techniques herein, an AMF, such as of AMF 122, may be considered a control plane element or control element of mobile network 120 and may facilitate access and mobility management control/services for one or more UEs for establishing connection with mobile network 120 (and/or one or more network slices of the mobile network, as applicable). In addition to various operations discussed for techniques herein, an SMF, such as any of SMF 134 and SMF 144 may be considered another control plane element of mobile network 120 and may be responsible for UE 101 PDU session management (SM), with individual functions/services being supported on a per-session basis in order to facilitate data transfer(s) between a given UE and one or more data network(s) 160 via one or more UPFs. Generally, a UPF, such as any of UPF 136 and UPF 146, may operate to provide packet routing and forwarding operations for user data traffic and may also perform a variety of functions such as packet inspection, traffic optimization, QoS, policy enforcement and user data traffic handling (e.g., to/from one or more data network(s) 160), and billing operations (e.g., accounting, etc.) for UE 101 PDU sessions.

Typically, a PCF, such as any of PCF 124, PCF 138, and PCF 148, stores policy data for the mobile network 120 and can interact with one or more AFs to provide in order to provide policy control services for a UE, such as UE 101 (e.g., to facilitate access control for UE 101, network selection, etc.) via UE-PCF logic, such as UE-PCF logic 124a shown for PCF 124, through UE 101 registration procedures performed with mobile network 120. SM-PCF logic, such as SM-PCF logic 124b shown for PCF 124, can also provide policy control services for a UE, such as UE 101, through UE 101 PDU session establishment procedures performed with mobile network 120. Although not shown, a PCF can also be configured with access management (AM)-PCF logic, which can also provide policy control services for a UE, such as UE 101, through UE 101 access and mobility management procedures performed with mobile network 120. In accordance with embodiments herein, PCF 124 can be enhanced to facilitate providing an updated URSP/URSP rule to a UE, such as UE 101, as discussed in further detail herein, below.

Typically, a CHF, such as CHF 126, provides support for charging services such as facilitating the transfer of policy counter information associated with subscriber (e.g., UE 101) spending limits, usage, etc. Generally, a DNS-AS, such as DNS-AS 128, may provide for resolving network services and/or applications that are "trusted" by mobile network 120/the mobile network operator. Generally, a NEF, such as NEF 129, can be provided to facilitate interfacing between mobile network operator network functions operating in a "trust" domain of a mobile network operator, such as PCF 124, which may be owned/operated by the mobile network operator of mobile network 120 and one or more application functions interfacing with one or more ASPs, such as AF 170 interfacing with ASP 172, that may be considered to be operating in an "untrusted" domain external to the "trust" domain of mobile network 120 and network elements/functions operated therein.

As shown in FIG. 1, UE 101 can establish a first session 103 (as generally illustrated via the dashed-line in FIG. 1) via slice 130 through which communications to/from data network(s) 160 can be provided. Generally, during operation of system 100 in order to facilitate providing sponsored data to UE 101, embodiments herein can provide for enhancing extensions to sponsored data connectivity triggers sent from an AF, such as AF 170, to the PCF 124/UE-PCF logic 124a to include service parameters that can enable the mobile network 120 and the UE 101 seeking to obtain certain sponsored content, such as content 174 sponsored by content sponsor 180, to establish sponsored data connectivity involving a sponsored network slice, such as network slice 140, for a second session 105 (e.g., as shown via the dashed-line in FIG. 1) initiated by the UE 101 through which an application experience and assurance can be provided to the UE 101 that is to access/obtain the sponsored content 174 via network slice 140.

The network slice 140 may be considered a "sponsored data slice" in accordance with embodiments herein such that financial sponsorship for connecting to the network slice 140 by UE 101 and obtaining data, such as content 174, via the network slice 140 is provided by a sponsoring entity other than the UE 101, such as content sponsor 180, which may be a different entity than the ASP 172 and is also different than the user operating UE 101 for certain examples discussed herein. However, it is to be understood that financial sponsorship for accessing sponsored data can be provided by any sponsoring entity in accordance with embodiments herein. As referred to herein, the terms, 'sponsored slice', 'sponsored data slice' and 'sponsored network slice' can be used interchangeably.

UE-PCF logic 124a can be enhanced in accordance with embodiments herein in order to trigger SM-PCF logic 124b to deliver an updated URSP/URSP rule to the UE 101 to enable the UE 101 to initiate connectivity to a particular (sponsored) network slice, such as network slice 140, in order to obtain sponsored content, such as content 174. The UE 101, upon obtaining the updated URSP/URSP rule can apply the updated URSP rule to initiate connectivity to a particular network slice, such as initiating the second session 105 with network slice 140, in order to obtain sponsored content 174, in accordance with various embodiments herein.

The updated URSP/URSP rule can include a sponsored data slice indication (e.g., a flag, a Type-Length-Value (TLV) object, a Boolean indication (TRUE/FALSE), or the like) such that the presence of the sponsored data slice indication indicates that the URSP/URSP rule pertains to a sponsored network slice for which connectivity is financially sponsored or otherwise not chargeable to the UE 101, such that a user of the UE 101 may be made aware that financial obligation for accessing/obtaining certain sponsored content will not be charged to the user (e.g., accessing/obtaining the content will be 'free' for the user).

It is noted that UE 101/the user operating UE 101 does not have a subscription to access/connect to a sponsored data slice, such as network slice 140, in order to obtain sponsored content in accordance with embodiments herein. Rather, connectivity to a sponsored data slice is provided to UE 101 "on-the-fly" utilizing various techniques as described herein through which the network can push an updated URSP/URSP rule to utilize a network slice that provides sponsored data connectivity.

In some instances, logic (e.g., intercept logic) can be configured for a UPF, such as UPF 136 handling the first session 103 for UE 101, such that the UPF 136 can identify/detect a sponsored content URI in order to trigger sending/delivering an updated URSP/URSP rule to the UE 101 to enable the UE 101 to initiate connectivity via the second session (105) to the particular network slice 140 in order to obtain sponsored content 174.

Various disconnect operations may also be prescribed in accordance with embodiments herein to cause the UE 101 or the mobile network 120 to disconnect/release the second session to the sponsored data slice once a disconnect is triggered for the second session. In various embodiments, a disconnect may be triggered based on the UE 101 satisfying one or more volume thresholds related to an amount of sponsored content obtained via a sponsored data slice (e.g., network slice 140) and/or satisfying one or more time or temporal thresholds related to a period and/or periods of time for which the UE is allowed to access/obtain sponsored content via a sponsored data slice.

Accordingly, embodiments herein provide for the ability to enhance sponsored data connectivity by enabling a mobile network to facilitate sponsorship for a network slice as part of sponsored connectivity in which the network slice can provide traffic flow specific SLA connectivity and treatment such that sponsored content can be accessed/obtained by a UE in a manner that meets an application experience and assurance as desired by a sponsor of the content (e.g., sponsoring entity) that is providing financial sponsorship for the content to be accessed/obtained by the UE.

Consider various additional operational features that may be associated with such techniques, as discussed in further detail with reference to FIGS. 2A and 2B, FIGS. 3A, 3B, and 3C, and FIG. 4, which message sequence diagrams illustrating call flows associated with sponsored data that may be provided to a UE, according to various example embodiments.

Figure 2A:
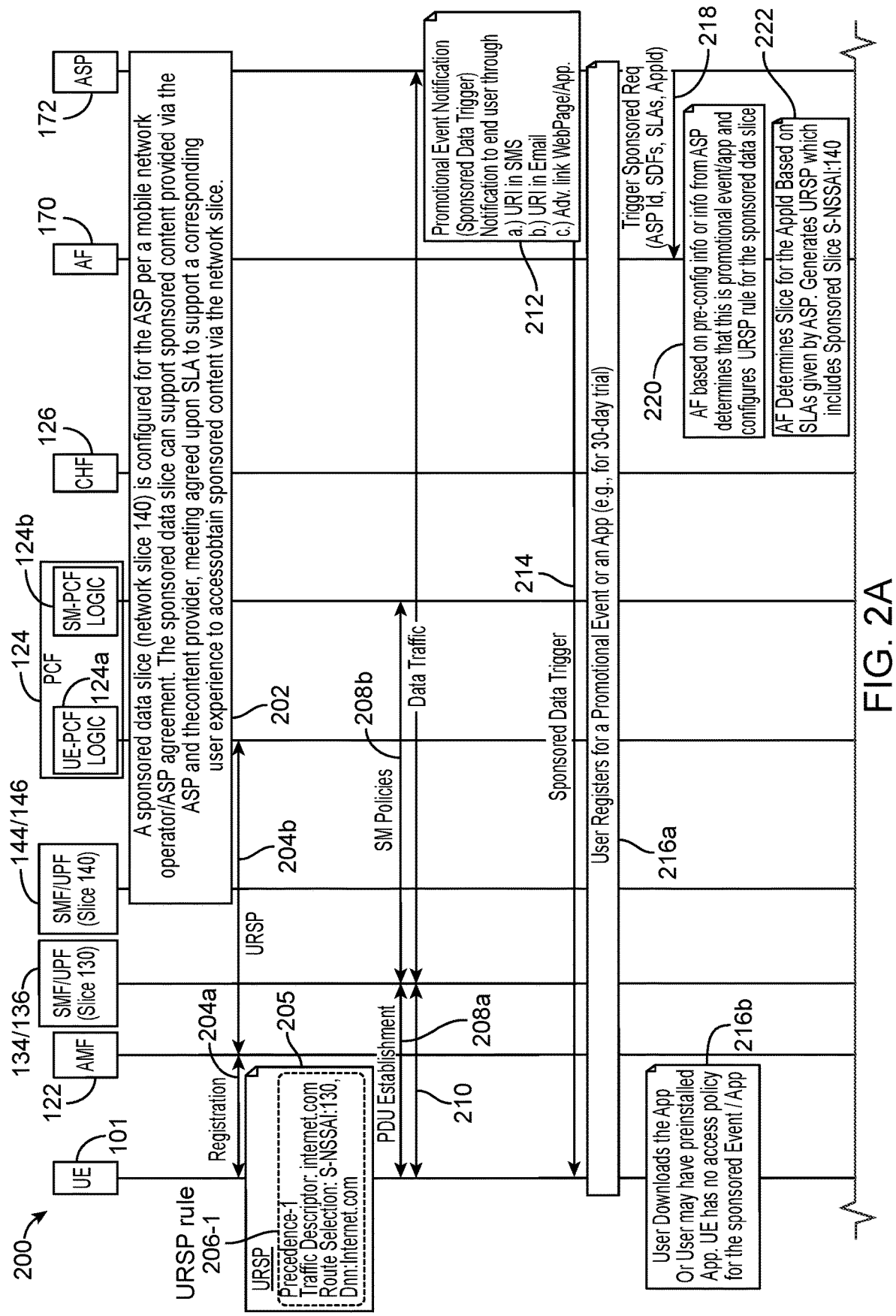
FIGS. 2A and 2B are a message sequence diagram illustrating a call flow associated with providing sponsored data for a UE in a mobile network environment, according to an example embodiment.
Figure 2B:
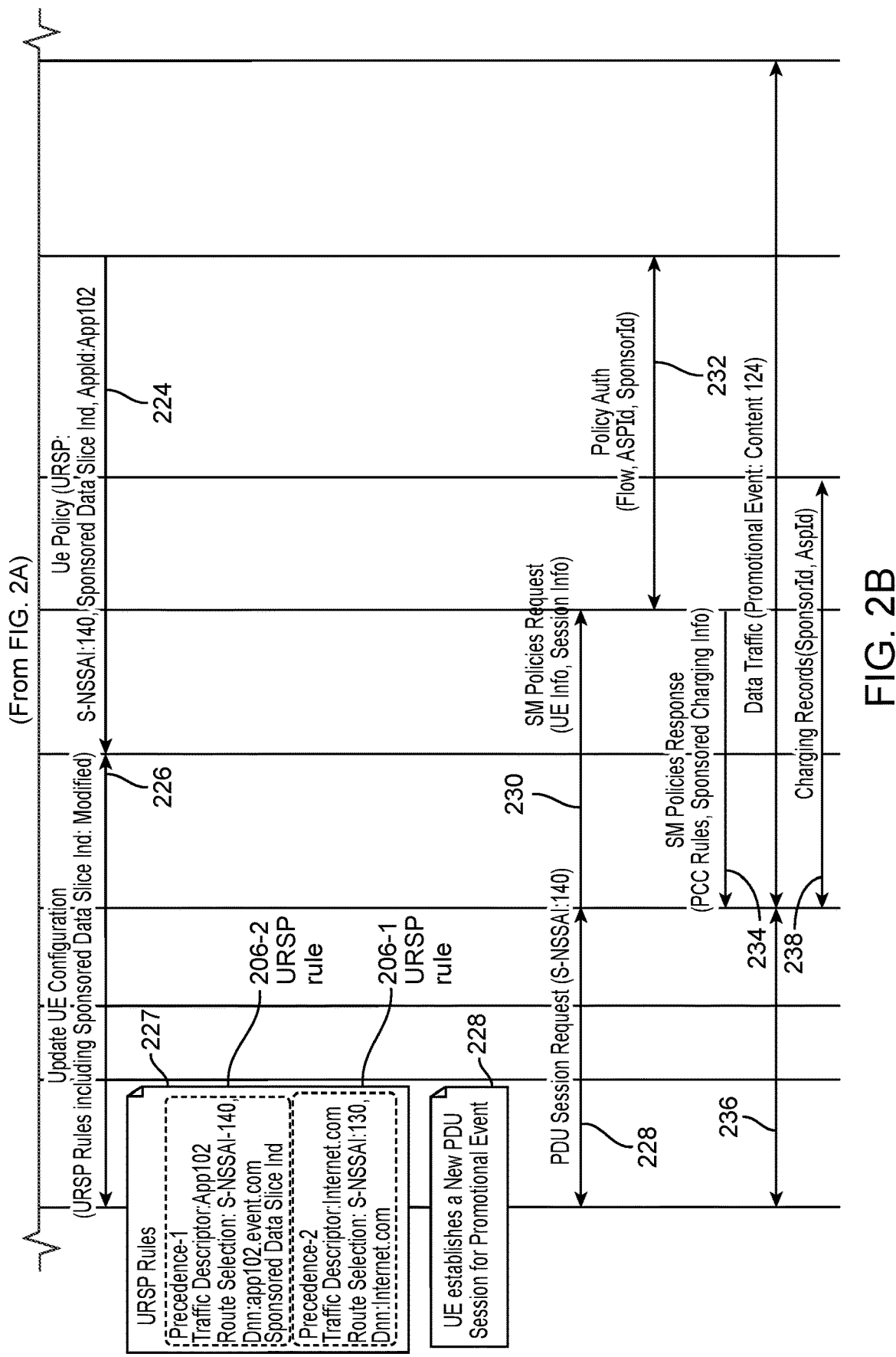

In particular, FIGS. 2A and 2B are a message sequence diagram illustrating a call flow 200 associated with providing sponsored data to UE 101 utilizing the first technique discussed above in which, based on a trigger from the AF 170, the PCF 124/UE-PCF logic 124a can send an updated URSP rule to UE 101 that contains sponsored data slice details (e.g., slice details for network slice 140). Based on the new URSP rule, UE 101 can establish a new PDU session (e.g., second session 105) that can be created on the sponsored data slice (network slice 140). FIGS. 2A and 2B include UE 101, AMF 122, SMF 134 and UPF 136 of network slice 130, SMF 144 and UPF 146 of network slice 140, PCF 124 including UE-PCF logic 124a and SM-PCF logic 124b, CHF 126, AF 170, and ASP 172.

For the embodiment of FIGS. 2A and 2B, network slice 130 may be considered an internet slice providing generic internet connectivity. For the embodiment of FIGS. 2A and 2B, as noted at 202, network slice 140 may be considered a 5G network slice providing sponsored data connectivity that is configured to be a sponsored data slice for the ASP 172 per an agreement between the mobile network operator of mobile network 120 and ASP 172 in which the network slice is to provide/meet an agreed upon SLA (e.g., throughput criteria, bit rate criteria, delay/jitter/latency criteria, reliability criteria, service level indication (e.g., gold, silver, bronze) etc.) that can support a corresponding user experience to access/obtain the sponsored content provided via the ASP 172 and content sponsor 180 (e.g., a game, a movie trailer, etc.).

At 204a, consider that UE 101 initiates a registration with mobile network 120 via AMF 122, in accordance with 3GPP standards, such that a (default) URSP is obtained for the UE 101 via PCF 124/UE-PCF logic 124a, as shown at 204b, that is to enable UE 101 to establish a first session (e.g., first session 103) with mobile network 120 via network slice 130. As shown at 205, the UE 101 stores the URSP, which contains a URSP rule 206-1 that identifies a rule precedence value of '1' ('Precedence-1'), and includes a traffic descriptor portion identifying a domain descriptor of 'internet.com' ('Traffic Descriptor: internet.com') and a route selection portion identifying network slice 130 ('S-NSSAI: 130') and a DNN of 'internet.com' ('Dnn:internet.com').

At 208a, consider that UE 101, through operation of application 102, seeks to establish a PDU session for accessing the internet (via data network(s) 160) and, based on URSP rule 206-1 initiates PDU session establishment for a first PDU session via network slice 130/SMF 134 (e.g., first session 103), which triggers SMF 134 to establish/obtain session management (SM) policies for the UE 101 via PCF 124/SM-PCF logic 124b, as shown at 208b. Upon successful establishment of the (first) PDU session, data traffic can be communicated between the UE 101, UPF 136, and the ASP 172 for operations involving application 102, as generally shown at 210.

As shown at 212, consider that ASP 172 generates a promotional event notification, referred to herein as a sponsored data trigger, to be send to UE 101 for content 174 that is to be provided to UE 101 via (sponsored) network slice 140. In various embodiments, the notification can include, but not be limited to a URI that can be sent to the UE via a URI included in a Short Message Service (SMS) text, a URI included in an email, an advertisement link in a web page/application content, combinations thereof, or the like.

As shown at 214, the notification (sponsored data trigger) is sent to the UE 101, through which the UE 101/user operating UE 101 can register for the promotional event, a sponsored application, etc. (e.g., for a 30-day trial, etc.) to obtain sponsored content 174, as shown at 216a. For example, the user/UE 101 can access/click on a promotional link, in the example for FIGS. 2A-2B. As shown at 216b, for instances involving a sponsored application, the user/UE 101 may have preinstalled the sponsored application or can download the sponsored application. The UE 101 is considered not to have an access policy/URSP for the sponsored event (and/or sponsored application, if applicable). In various embodiments, the sponsored application could be a standard application that is used for sponsored data and/or an application that can be used for both sponsored and non-sponsored content.

As shown at 218, ASP 172 can trigger a sponsored data request towards AF 170 that includes sponsored data information associated with content sponsor 180 and sponsored content 174 to be provided to UE 101. The sponsored data information includes an identifier for the sponsoring entity/sponsor (sponsorId or SponsorId) that is to provide financial sponsorship for the UE 101 to access/obtain the sponsored content 174, such as content sponsor 180 in this example (e.g., 'SponsorId:180'), the ASPId for ASP 172 (e.g., 'ASPId:172'), an AppId (e.g., either for application 102 (e.g., 'AppId:App102') or another application, as applicable), and also SDF flow information used to identify/detect data traffic (e.g., via a UPF) for the sponsored event/content 174 (e.g., AppId, tuple information such as source/destination IP address/port, etc.), which can be used to generate Charging Data Records (CDRs) for traffic associated with the content 174. For instances involving a trial application, the SDF flow information can be used to identify traffic for the application.

The sponsored data information sent from the ASP 172 to the AF 170 can also include SLA information (e.g., throughput criteria, bit rate criteria, delay/jitter/latency criteria, reliability criteria, service level indication, etc.) associated with network slice 140. The sponsored data information sent from the ASP 172 to the AF 170 can also identify any combination of volume threshold(s) related to an amount of sponsored content 174 that can accessed/obtained for the promotional event and/or one or more time/temporal thresholds related to a period/periods of time for which the UE 101 is allowed to access/obtain the sponsored content 174.

It is to be understood that operations 216a/b and 218 can be performed in parallel or in any order; the order of operations shown in FIG. 2A is provided for illustrative purposes only and is not meant to limit the broad scope of embodiments herein.

At 220, the AF 170, based on pre-configured URSP rule information and/or information that can be provided to the AF 170 from ASP 172, determines that a promotional event/app has been triggered regarding content 174 and configures a URSP rule (shown as URSP rule 206-2 in FIG. 2B) for the event that can be used to trigger UE 101 to connect to a sponsored data slice, such as network slice 140, in order to access/obtain sponsored content 174 (or to use a trial application, if applicable). As shown at 222, in one example, the AF 170 can determine the sponsored data slice for the AppId ('AppId:102') based on SLA information and/or an S-NSSAI identifying the sponsored data slice provided to the AF 170 from the ASP in order to generate the URSP rule to enable UE 101 to connect to network slice 140 ('S-NSSAI:140'). In one example, the URSP rule 206-2 can include a precedence value of '1' (e.g., 'Precedence-1'), a traffic descriptor portion identifying application 102 (e.g., 'Traffic Descriptor: AppId:App102'), and a route selection portion identifying network slice 140 and a DNN for the event (e.g., 'Route Selection: S-NSSAI:140, Dnn: app102.event.com').

In accordance with embodiments herein, the URSP rule also include the new sponsored data slice indication ('Sponsored data Slice Ind', as shown in FIG. 2B) that indicates that the URSP rule pertains to a sponsored network slice for which connectivity is financially sponsored or otherwise not chargeable to the UE 101, such that the user of the UE 101 may be made aware that financial obligation for accessing/ obtaining certain sponsored content will not be charged to the user (e.g., accessing/obtaining the content will be 'free' for the user).

Continuing to FIG. 2B, at 224, upon generating the URSP rule, the AF 170 sends a UE policy message to PCF 124/UE-PCF logic 124a containing the new URSP rule including the new sponsored data slice indication. Obtaining the new URSP rule by the PCF 124/UE-PCF logic 124a triggers the PCF 124/UE-PCF logic 124a, via AMF 122, to send an Update UE Configuration message to UE 101, as shown at 226, that includes the new URSP (modified/updated) rule including the sponsored data slice indication to trigger the UE to install/store the new URSP rule into its existing URSP, as shown at 227, such that the URSP includes the new URSP rule 206-2 for enabling UE 101 connectivity to sponsored network slice 140 (and which includes the sponsored data slice indicator) for the promotional event to access/obtain content 174 and the URSP also includes the previously configured URSP rule 206-1 as discussed for FIG. 2A.

As shown at 228, obtaining the new URSP rule 206-2 for the promotional event enables UE 101 to establish a new PDU session (second session 105) for the event using the URSP rule 206-2 in which the UE 101 can send a PDU session request message towards SMF 144 of network slice 140 ('S-NSSAI: 140'), which triggers SMF 144 to initiate an SM policy request towards PCF 124/SM-PCF logic 124b, as shown at 230, that includes information for UE 101 and session information for the PDU session. In various embodiments, UE 101 information can include an International Mobile Subscriber Identity (IMSI), a Subscription Concealed Identity (SUCI), a Network Access Identifier (NAI, when using a non-SIM identity), a Subscription Permanent Identity (SUPI), and/or a Permanent Equipment Identity (PEI) for UE 101, session type/ID information, DNN/APN information, and/or any other information as may be prescribed at least in part by 3GPP TS 29.512.

As shown at 232, a policy authorization exchange is performed between PCF 124/SM-PCF logic 124b and AF 170 through which AF 170 provides the SDF flow information, the ASPId for ASP 172, and the SponsorId for content sponsor 180 (e.g., the sponsoring entity) that is to provide financial sponsorship for the event/content 174. Recall, UE 101 does not have a subscription for network slice 140, however, determining authorization for the UE 101 to establish a session with the sponsored data slice (network slice 140) may be performed based on determining whether financial sponsorship is applicable to the UE and/or through standards-based authorization procedures prescribed by 3GPP TS 33.501, based on mobile network subscription information for the UE 101 maintained in the mobile network (e.g., via PCF 124).

Using the information obtained from the AF 170, PCF 124/SM-PCF logic 124b sends an SM policy response message to SMF 144, as shown at 234, that includes Policy and Charging Control (PCC) rules for the SDF that the SMF 144 installs on UPF 146 (not shown) and includes the sponsored charging information for the event/content 174 to be accessed/obtained by UE 101, such as the SDF flow information, ASPId, and SponsorId that can be associated with the PCC rules for generating charging records (e.g., CDRs) for data traffic associated with content 174 accessed/obtained by UE 101.

Although not shown in FIG. 2B, a PDU session establishment accept message can be sent to UE 101 per 3GPP standards to confirm establishment of the PDU session and, as shown at 236, data traffic can be communicated between UE 101 via network slice 140 (e.g., via UPF 146) and ASP 172 in order for the UE 101 to access/obtain content 174 (e.g., a movie trailer, a game, etc.). It is noted that the first session (103) and the second session (105) can be provided contemporaneously for the UE 101. Based the PCC rules installed on UPF 146, UPF 146 can detect the data traffic using the SDF flow information in order to generate charging records that include the ASPId identifying ASP 172 and the SponsorId identifying content sponsor 180 (e.g., the sponsoring entity) that is to provide financial sponsorship for UE 101 accessing/obtaining content 174 for the event. The charging records are sent to CHF 126 via SMF 144, as shown at 238.

Accordingly, FIGS. 2A and 2B illustrate example details for the first technique associated with providing enhanced sponsored data connectivity by enabling a mobile network to facilitate sponsorship for a network slice as part of sponsored connectivity in which the network slice can provide traffic flow specific SLA connectivity and treatment such that sponsored content can be accessed/obtained by a UE in a manner that meets an application experience and assurance as desired by a sponsor/sponsoring entity of the content that is providing financial sponsorship for the content to be accessed/obtained by the UE.

Figure 3A:
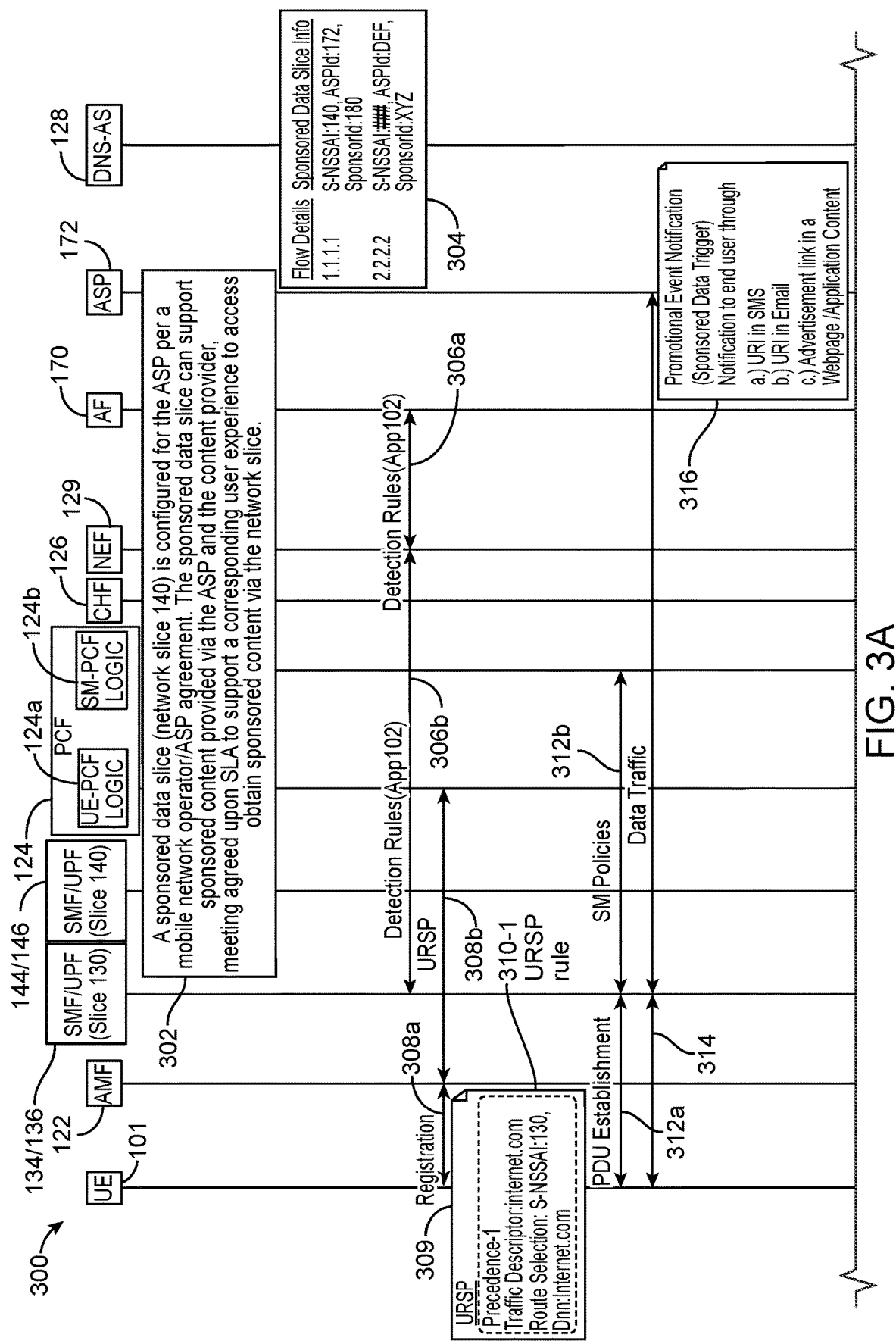
Figure 3B:
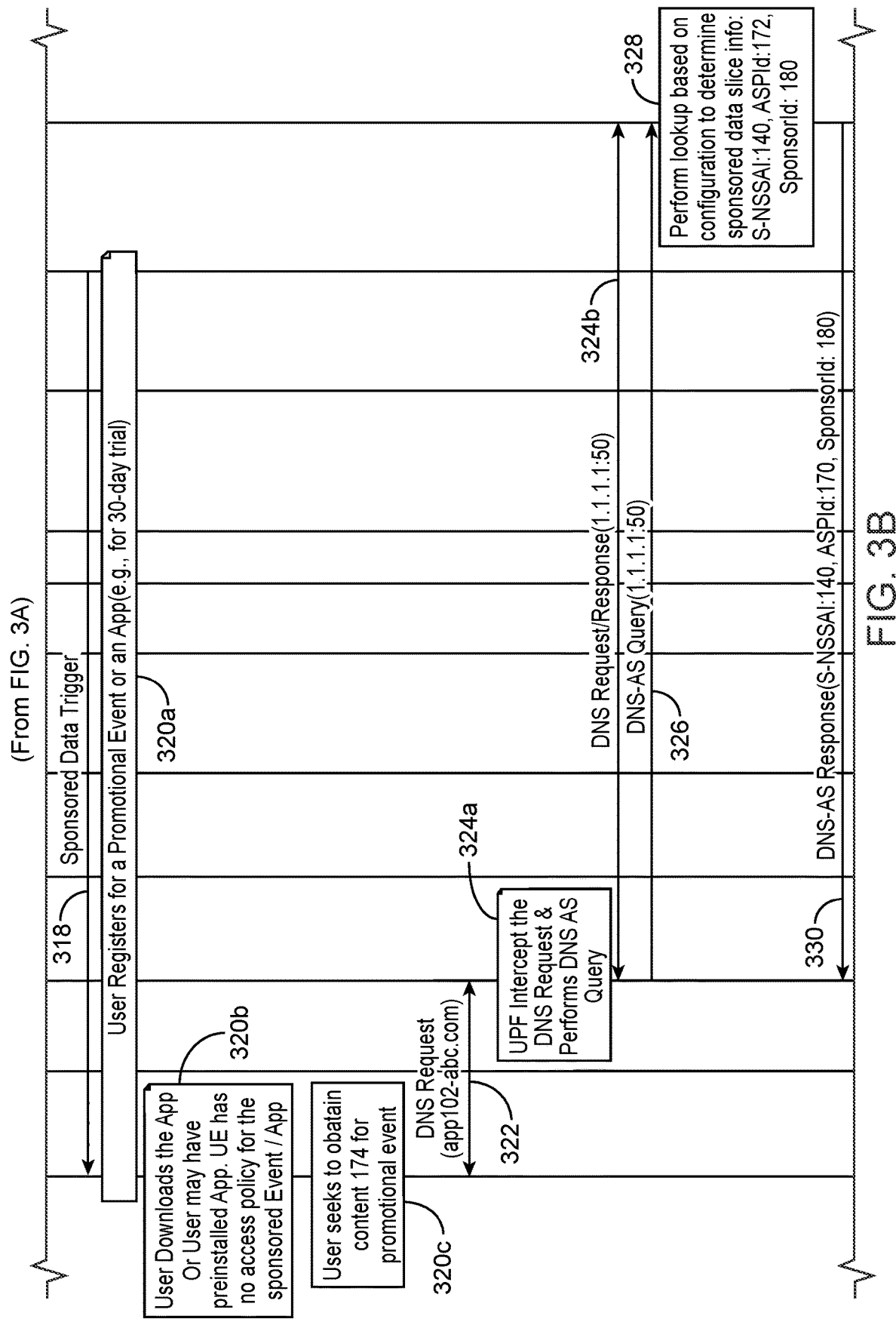

Referring to FIGS. 3A, 3B, and 3C, FIGS. 3A, 3B, and 3C are a message sequence diagram illustrating a call flow 300 associated with providing sponsored data to UE 101 utilizing the second technique discussed above in which, based on DNS-AS provided information, the mobile network can trigger a URSP rule update for a sponsored data slice. FIGS. 3A, 3B, and 3C include UE 101, AMF 122, SMF 134 and UPF 136 of network slice 130, SMF 144 and UPF 146 of network slice 140, PCF 124 including UE-PCF logic 124a and SM-PCF logic 124b, CHF 126, NEF 129, AF 170, ASP 172, and DNS-AS 128.

Further for the embodiment of FIGS. 3A, 3B, and 3C, network slice 130 may be considered an internet slice providing internet connectivity. For the embodiment of FIGS. 3A, 3B, and 3C, as noted at 302, network slice 140 may be considered a 5G network slice providing sponsored data connectivity that is configured to be a sponsored data slice for the ASP 172 per an agreement between the mobile network operator of mobile network 120 and ASP 172 in which the network slice is to provide/meet an agreed upon SLA (e.g., throughput criteria, bit rate criteria, delay/jitter/latency criteria, reliability criteria, etc.) that can support a corresponding user experience to access/obtain the sponsored content provided via the ASP 172.

Further for the embodiment of FIGS. 3A, 3B, and 3C, consider at 304 that DNS-AS 128 is configured to includes flow details for resolving a DNS request associated with a domain for application 102 for accessing/obtaining content 174 (e.g., via a promotional event), such as 'app102-abc.com' as discussed in this example which can be resolved to an IP address '1.1.1.1'. Further, the DNS-AS 128 can be configured (e.g., statically by an administrator, automatically based on interaction with ASP 170, etc.) with sponsored data slice information for application 102 that can be associated with a promotional event through which content 174 can be provided to a UE, such as UE 101, in which the sponsored data slice information can be configured in a DNS text (TXT) record (or any other appropriate DNS protocol) that identifies network slice 140 ('S-NSSAI:140'), the ASPId for ASP 172 ('ASPId:172'), and the SponsorId for content sponsor 180 ('SponsorId:180') for the promotional event. It is to be understood that other flow details/sponsored data slice information can be configured for DNS-AS 128 for one or more other applications/events (e.g., an application domain that resolves to IP address '2.2.2.2' for an event associated with another network slice (e.g., 'S-NSSAI: ###'), another ASPId (e.g., 'ASPId:DEF') and another SponsorId (e.g., 'SponsorId:XYZ').

As shown at 306a and 306b, AF 170, via NEF 129, communicates detection rules for application 102 to UPF 146 for network slice 140 to enable the UPF to intercept and identify/detect a DNS query associated with application 102. In particular, the detection rules for application 102 may identify a DNS query for the domain 'app102-abc.com' associated with the promotional event, which can trigger additional operations as discussed in further detail below. In some instances, ASP 172 can provide the detection rules to AF 170, the detection rules can be configured by a network administrator, combinations thereof, and/or the like.

At 308a, consider that UE 101 initiates a registration with mobile network 120 via AMF 122, in accordance with 3GPP standards, such that a (default) URSP is obtained for the UE 101 via PCF 124/UE-PCF logic 124a, as shown at 308b, that is to enable UE 101 to establish a first session (e.g., first session 103) with mobile network 120 via network slice 130. As shown at 309, the UE 101 stores the URSP, which contains a URSP rule 310-1 that identifies a rule precedence value of '1' ('Precedence-1'), and includes a traffic descriptor portion identifying a domain descriptor of 'internet.com' ('Traffic Descriptor: internet.com') and a route selection portion identifying network slice 130 ('S-NSSAI: 130') and a DNN of 'internet.com' ('Dnn:internet.com').

At 312a, consider that UE 101, through operation of application 102, seeks to establish a PDU session for accessing the internet (via data network(s) 160) and, based on URSP rule 310-1 initiates PDU session establishment for a first PDU session via network slice 130/SMF 134 (e.g., first session 103), which triggers SMF 134 to establish/obtain SM policies for the UE 101 via PCF 124/SM-PCF logic 124b, as shown at 312b. Upon successful establishment of the (first) PDU session, data traffic can be communicated between the UE 101, UPF 136, and the ASP 172 for operations involving application 102, as generally shown at 314.

As shown at 316, consider that ASP 172 generates a promotional event notification, referred to herein as a sponsored data trigger, to be send to UE 101 for content 174 that is to be provided to UE 101 via (sponsored) network slice 140. In various embodiments, the notification can include, but not be limited to a URI that can be sent to the UE via a URI included in an SMS text, a URI included in an email, an advertisement link in a web page/application content, combinations thereof, or the like.

Continuing to FIG. 3B, as shown at 318, the notification (sponsored data trigger) is sent to the UE 101, through which the UE 101/user operating UE 101 can register for the promotional event, a sponsored application, etc. (e.g., for a 30-day trial, etc.) to obtain sponsored content 174, as shown at 320a. For example, the user/UE 101 can access/click on a promotional link, in the example for FIGS. 3A-3C. As shown at 320b, for instances involving a sponsored application, the user/UE 101 may have preinstalled the sponsored application or can download the sponsored application. The UE 101 is considered not to have an access policy/URSP for the sponsored event (and/or sponsored application, if applicable). In various embodiments, the sponsored application could be a standard application that is used for sponsored data and/or an application that can be used for both sponsored and non-sponsored content.

As shown at 320c, consider that the user/UE 101 seeks to obtain content 174 for the promotional event (e.g., by clicking a link, automatically following the registration, after installing an application for a promotional event, etc.) such that UE 101 initiates a DNS request for the domain 'app102-abc.com', as shown at 322.

At 324a, UPF intercepts the DNS request and, based on the configured detection rule identifying the domain 'app102-abc.com' performs a DNS-AS request/response exchange involving DNS-AS 128 for the domain in order to determine an IP address for the domain, as shown at 324b, through which DNS-AS 128 provides the IP address '1.1.1.1:50' (for a port '50') to UPF 136.

As shown at 326, UPF 136 performs a DNS query for the IP address towards DNS-AS 128, which triggers DNS-AS 128 to perform a lookup using the IP address, as shown at 328, in order to identify/determine sponsored data slice information for the event that identifies 'S-NSSAI:140', 'ASPId:172', and 'SponsorId:180' as configured for the DNS-AS 128. As shown at 330, DNS-AS 128 sends a DNS-AS response to UPF 136 that includes the sponsored data slice information, which the UPF 136 can communicate to SMF 134 via Packet Forwarding Control Protocol (PFCP)/N4 interface exchanges with the SMF 134. Continuing to FIG. 3C, as shown at 332, SMF 134 notifies the AF 170 regarding the sponsored data slice information and SDF flow information for data traffic for the session, via an AF notification that identifies the application ('AppId:102'), the (sponsored) network slice 140 ('S-NSSAI:140'), the ASPId for ASP 172 ('ASPId:172') and the sponsoring entity/sponsor (SponsorId) that is to provide financial sponsorship for the UE 101 to access/obtain the sponsored content 174, such as content sponsor 180 in this example (e.g., 'SponsorId:180'), and SDF information.

At 334, the AF 170, based on pre-configured URSP rule information and/or information that can be provided to the AF 170 from ASP 172, determines that a promotional event/app has been triggered regarding content 174 and configures a URSP rule (shown as URSP rule 310-2 in FIG. 3B) for the event that can be used to trigger UE 101 to connect to a sponsored data slice, such as network slice 140, in order to access/obtain sponsored content 174 (or to use a trial application, if applicable). As shown at 336, in one example, the AF 170 can determine the sponsored data slice for the AppId ('AppId:102') based on the AF notification identifying the network slice 140 ('S-NSSAI:140'). In one example, the URSP rule 310-2 can include a precedence value of '1' (e.g., 'Precedence-1'), a traffic descriptor portion identifying a destination IP address associated with SDF flow information used to identify/detect data traffic for the sponsored event/content 174 (e.g., 'Traffic Descriptor: dest: 1.1.1.1:500'), and a route selection portion identifying network slice 140 and a DNN for the event (e.g., 'Route Selection: S-NSSAI:140, Dnn: app102.event.com').

In accordance with embodiments herein, the URSP rule also include the new sponsored data slice indication ('Sponsored Data Slice Ind', as shown in FIG. 3B) that indicates that the URSP rule pertains to a sponsored network slice for which connectivity is financially sponsored or otherwise not chargeable to the UE 101, such that the user of the UE 101 may be made aware that financial obligation for accessing/obtaining certain sponsored content will not be charged to the user (e.g., accessing/obtaining the content will be 'free' for the user).

At 338, upon generating the URSP rule, the AF 170 sends a UE policy message to PCF 124/UE-PCF logic 124a containing the new URSP rule including the new sponsored data slice indication. Obtaining the new URSP rule by the PCF 124/UE-PCF logic 124a triggers the PCF 124/UE-PCF logic 124a, via AMF 122, to send an Update UE Configuration message to UE 101, as shown at 340, that includes the new URSP (modified/updated) rule including the sponsored data slice indication to trigger the UE to install/store the new URSP rule into its existing URSP, as shown at 341, such that the URSP includes the new URSP rule 310-2 for enabling UE 101 connectivity to sponsored network slice 140 (and which includes the sponsored data slice indicator) for the promotional event to access/obtain content 174 and the URSP also includes the previously configured URSP rule 310-1, as discussed for FIG. 3A.

As shown at 342, obtaining the new URSP rule 310-2 for the promotional event enables UE 101 to establish a new PDU session (second session 105) for the event using the URSP rule 310-2 in which the UE 101 can send a PDU session request message towards SMF 144 of network slice 140 ('S-NSSAI: 140'), which triggers SMF 144 to initiate an SM policy request towards PCF 124/SM-PCF logic 124b, as shown at 344, that includes information for UE 101 and session information for the PDU session. In various embodiments, UE 101 information can include an IMSI for UE 101.

As shown at 346, a policy authorization exchange is performed between PCF 124/SM-PCF logic 124b and AF 170 through which AF 170 provides the SDF flow information, the ASPId for ASP 172, and the SponsorId for content sponsor 180 (e.g., sponsoring entity) that is to provide financial sponsorship for the event/content 174. Recall, UE 101 does not have a subscription for network slice 140.

Using the information obtained from the AF 170, PCF 124/SM-PCF logic 124b sends an SM policy response message to SMF 144, as shown at 348, that includes PCC rules for the SDF that the SMF 144 installs on UPF 146 (not shown) and includes the sponsored charging information for the event/content 174 to be accessed/obtained by UE 101, such as the SDF flow information, ASPId, and SponsorId that can be associated with the PCC rules for generating charging records (e.g., CDRs) for data traffic associated with content 174 accessed/obtained by UE 101.

Although not shown in FIG. 3B, a PDU session establishment accept message can be sent to UE 101 per 3GPP standards to confirm establishment of the PDU session and, as shown at 350, data traffic can be communicated between UE 101 via network slice 140 (e.g., via UPF 146) and ASP 172 in order for the UE 101 to access/obtain content 174 (e.g., a movie trailer, a game, etc.). It is noted that the first session (103) and the second session (105) can be provided contemporaneously for the UE 101. Based the PCC rules installed on UPF 146, UPF 146 can detect the data traffic using the SDF flow information in order to generate charging records that include the ASPId identifying ASP 172 and the SponsorId identifying content sponsor 180 (e.g., sponsoring entity) that is to provide financial sponsorship for UE 101 accessing/obtaining content 174 for the event. The charging records are sent to CHF 126 via SMF 144, as shown at 352.

Accordingly, FIGS. 3A and 3B illustrate example details for the second technique associated with providing enhanced sponsored data connectivity by enabling a mobile network to facilitate sponsorship for a network slice as part of sponsored connectivity in which the network slice can provide traffic flow specific SLA connectivity and treatment such that sponsored content can be accessed/obtained by a UE in a manner that meets an application experience and assurance as desired by a sponsor/sponsoring entity of the content that is providing financial sponsorship for the content to be accessed/obtained by the UE.

Figure 4:
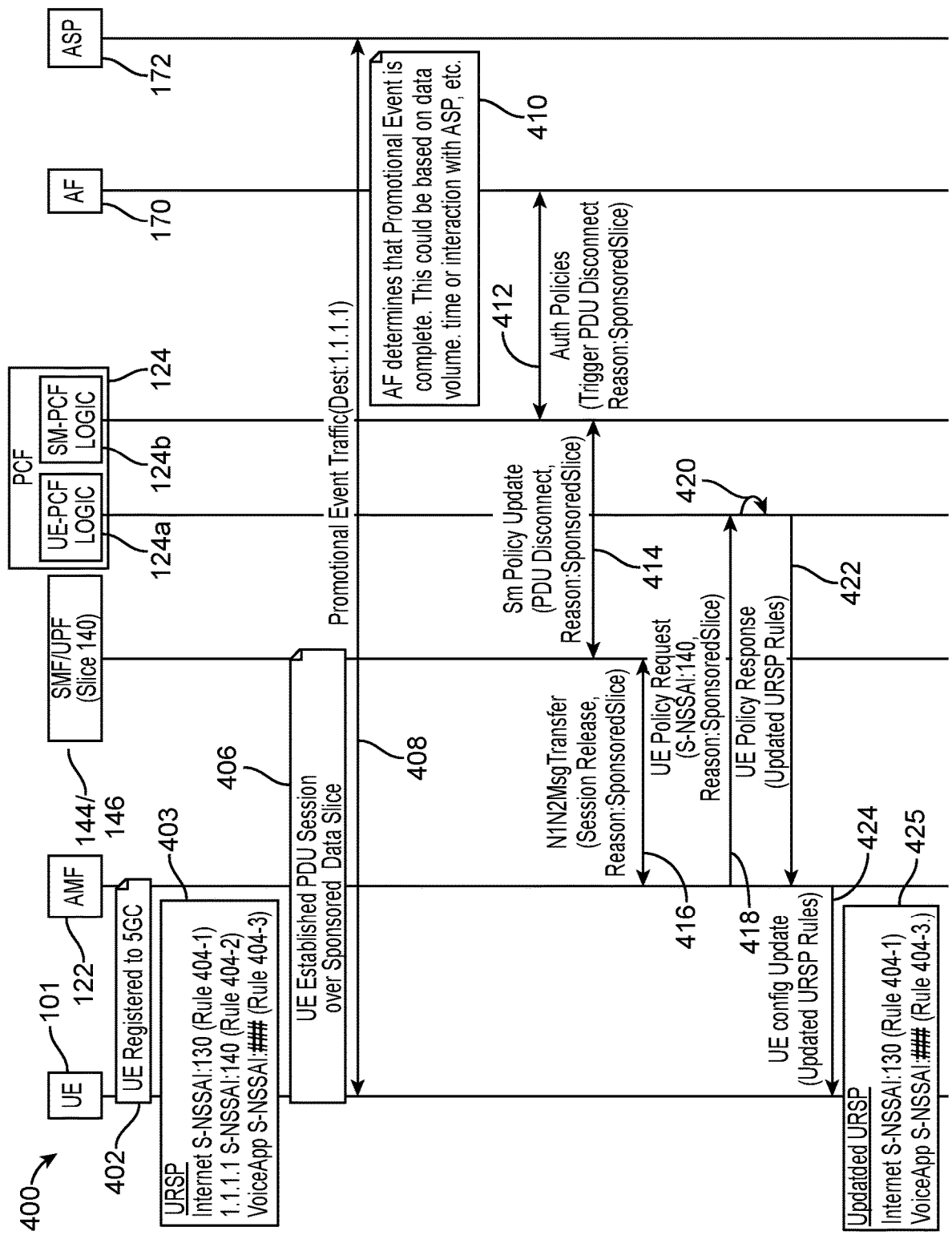
FIG. 4 is a message sequence diagram illustrating a call flow associated with disconnecting sponsored data provided for a UE in a mobile network environment, according to an example embodiment.

FIG. 4 is a message sequence diagram illustrating a call flow 400 associated with disconnecting a sponsored data slice, according to an example embodiment. For example, when a promotional event is over, the mobile network can disconnect a PDU session for UE 101 and remove sponsored data slice information from the UE 101 by updating a URSP rule for the UE 101. FIG. 4 includes UE 101, AMF 122, SMF 144 and UPF 146 of network slice 140, PCF 124 including UE-PCF logic 124a and SM-PCF logic 124b, AF 170, and ASP 172.

For the embodiment of FIG. 4, consider at 402 that UE 101 is registered to the mobile network 120 via AMF 122. Further consider at 403 that UE 101 has stored a URSP containing various URSP rules, including a first URSP rule 404-1 that includes a traffic descriptor portion identifying internet traffic and a route selection portion including 'S-NSSAI:130', a second URSP rule 404-2 that includes a traffic descriptor portion identifying event traffic (e.g., for a destination IP address '1.1.1.1') and a route selection portion including 'S-NSSAI: 140', and a third URSP rule 404-3 that includes a traffic descriptor portion including an identifier a voice application (e.g., 'AppId:VoiceApp') and a route selection portion including another network slice (e.g., 'S-NSSAI: ###'). Further consider at 406, that UE 101 establishes a PDU session of a sponsored network slice, such as network slice 140 in this example, via SMF 144/UPF 146 and exchanges data traffic, as shown at 408, involving accessing/obtaining content for the promotional event involving ASP 172 in this example.

Thereafter, consider at 410 that AF 170 determines that the promotional event is complete based on satisfying some volume threshold(s), time/time period threshold(s), based on a notification obtained from ASP 172, and/or the like such that the AF 170 determines that UE 101 is to release/disconnect the session involving the sponsored network slice. Based on the determination, AF 170 initiates an authorization policy update exchange via PCF 124/SM-PCF logic 124b, as shown at 412 to trigger a disconnect for the UE 101 PDU session involving (sponsored) network slice 140. Through the exchange, the AF 170 can provide a session disconnect reason indicator to the PCF 124/SM-PCF logic 124b indicating that the disconnect involves a sponsored data slice or sponsored data connectivity (e.g., 'Reason:SponsoredSlice', 'Reason: SponsoredData', etc.). Including the session disconnect indicator indicating that the disconnect involves a sponsored data slice/sponsored data connectivity can trigger, as discussed below, the removal of the URSP rule for UE 101 that (prior to a promotional event ending) enabled the UE 101 to connect to the sponsored network slice for the promotional event.

The PCF 124/SM-PCF logic 124b can carry out the session disconnect via an SM policy update exchange with SMF 144, as shown at 414, that further includes the session disconnect reason indicator. Thereafter, the SMF 144 initiates a session release exchange via AMF 122, as shown at 416 (through N1N2 message transfer signaling), that further includes the session disconnect indicator.

Thereafter, as shown at 418, AMF 122 communicates a UE policy (update) request message to PCF 124/UE-PCF logic 124a that identifies the sponsored network slice ('S-NSSAI:140) and further includes the session disconnect indicator that triggers PCF 124/UE-PCF logic 124a to update the URSP/URSP rules for UE 101 to remove the sponsored data slice URSP rule (rule 404-2), as shown at 420. As shown at 422, PCF 124/UE-PCF logic 124a communicates a UE policy request message to AMF 122, which communicates a UE configuration update message to UE 424 including the updated URSP rules, which UE 101 stores, as shown at 425, that include URSP rule 404-1 and 404-3, but not URSP rule 404-2 that was provided for enabling connectivity to sponsored network slice 140 for the promotional event.

Accordingly, FIG. 4 illustrates a technique through which, when a promotional event is over, an AF can trigger a PDU session disconnect and, by including a session disconnect indicator indicating that the disconnect involves a sponsored data slice/sponsored data connectivity can trigger the removal of a URSP rule for a UE that (prior to a promotional event ending) enabled the UE to connect to the sponsored network slice for the promotional event.

Figure 5:
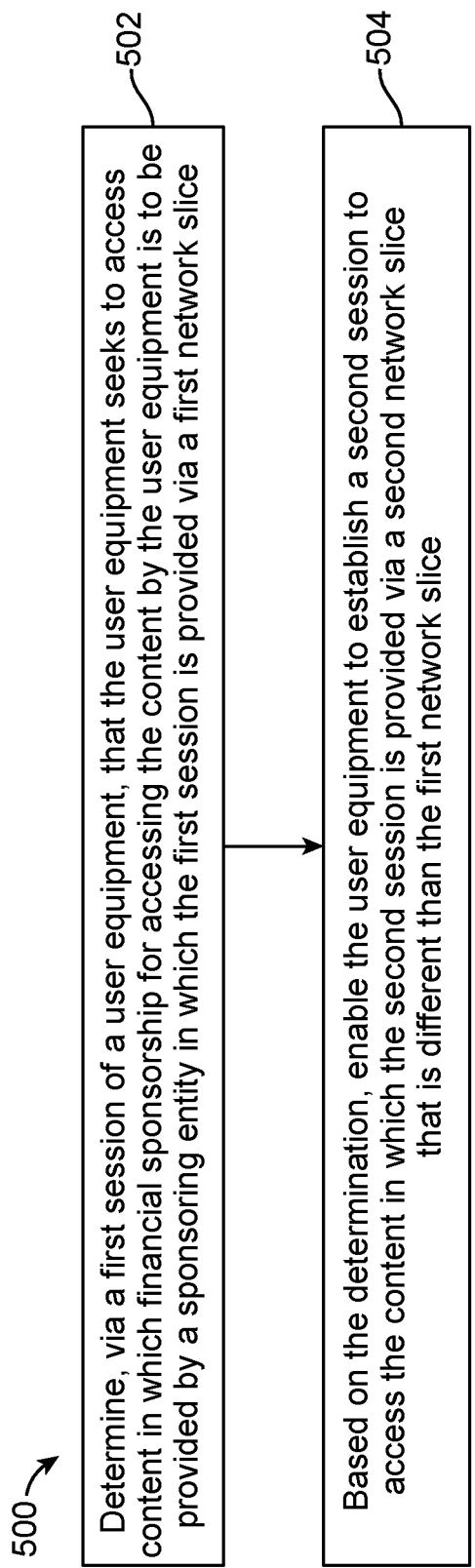
FIG. 5 is a flow chart depicting a method according to an example embodiment.

Referring to FIG. 5, FIG. 5 is a flow chart depicting a method 500 according to an example embodiment. In at least one embodiment, method 500 illustrates example operations that may be performed, at least in part, by a network element, according to various example embodiments.

At 502, the method may include determining, via a first session of a user equipment, that the user equipment seeks to access content in which financial sponsorship for accessing the content by the user equipment is to be provided by a sponsoring entity, wherein the first session is provided via a first network slice. In at least one embodiment, the sponsoring entity may be an application service provider or content provider that is providing the content to the user equipment. In at least one embodiment, the sponsoring entity may be an entity that is different from an application service provider or content provider that is providing the content to the user equipment.

At 504, the method may include, based on the determining, enabling the user equipment to establish a second session to access the content, wherein the second session is provided via a second network slice that is different than the first network slice.

In one instance, the first session and the second session are provided contemporaneously for the user equipment. The user equipment does not have a subscription to connect to the second network slice. In one instance, the determining and the enabling are performed by an application function of a mobile network. In one instance, the determining may include intercepting, by a user plane function associated with the first session of the user equipment, a DNS request initiated by the user equipment and providing, by a session management function associated with the first session, an indication to the application function indicating that the user equipment seeks to access the content. In one instance, the indication includes sponsored data slice information associated with the second session that the user plane function obtains from a DNS server through a DNS query following the DNS request.

Accordingly, as discussed for embodiments herein, at least two techniques may be utilized to enable sponsored data for a UE in a mobile network environment with new capabilities for supporting application experience and assurance (e.g., through an SLA associated with a given network slice/slice type). Through the first technique, a trigger for sponsored data enablement can be based on an AF trigger that can be initiated upon an end user (UE) signing-up for or otherwise initiating a request for sponsored content. Through the second technique, a trigger for sponsored data enablement can based on intercepting a DNS query from a UE, such that when a user of the UE accesses or otherwise initiates access to a sponsored data URI, the mobile network or, more specifically, a UPF of a mobile network slice, can detect the sponsored data link/URI and activate steps for sponsored data enablement that can provide/meet a particular application experience and assurance.

Broadly, embodiments herein can provide for enhancing extensions to sponsored data connectivity triggers sent from an AF to a PCF/UE-PCF logic to include service parameters that can enable the mobile network and a UE seeking to obtain certain sponsored content to facilitate sponsored data connectivity through which an application experience and assurance can be provided to the UE that is to obtain the sponsored content. UE-PCF logic can be enhanced in accordance with embodiments herein in order to trigger SM-PCF logic to deliver an updated URSP/URSP rule to the UE to enable the UE to initiate connectivity to a particular network slice in order to obtain sponsored content. In some instances, intercept logic can be configured for a UPF such that the UPF can identify/detect a sponsored content URI in order to trigger sending/delivering an updated URSP/URSP rule to a UE to enable the UE to initiate connectivity to a particular network slice in order to obtain sponsored content. A UE obtaining an updated URSP/URSP rule can apply the updated URSP rule to initiate connectivity to a particular network slice in order to obtain sponsored content, in accordance with various embodiments herein.

Accordingly, embodiments herein provide for the ability to enhance sponsored data connectivity by enabling a mobile network to facilitate sponsorship of a network slice as part of sponsored connectivity in which the network slice can provide traffic flow specific SLA connectivity and treatment such that sponsored content can be accessed/obtained by a UE in a manner that meets an application experience and assurance as desired by a sponsor of the content (e.g., sponsoring entity) that is providing financial sponsorship for the content to be accessed/obtained by the UE.

Figure 6:
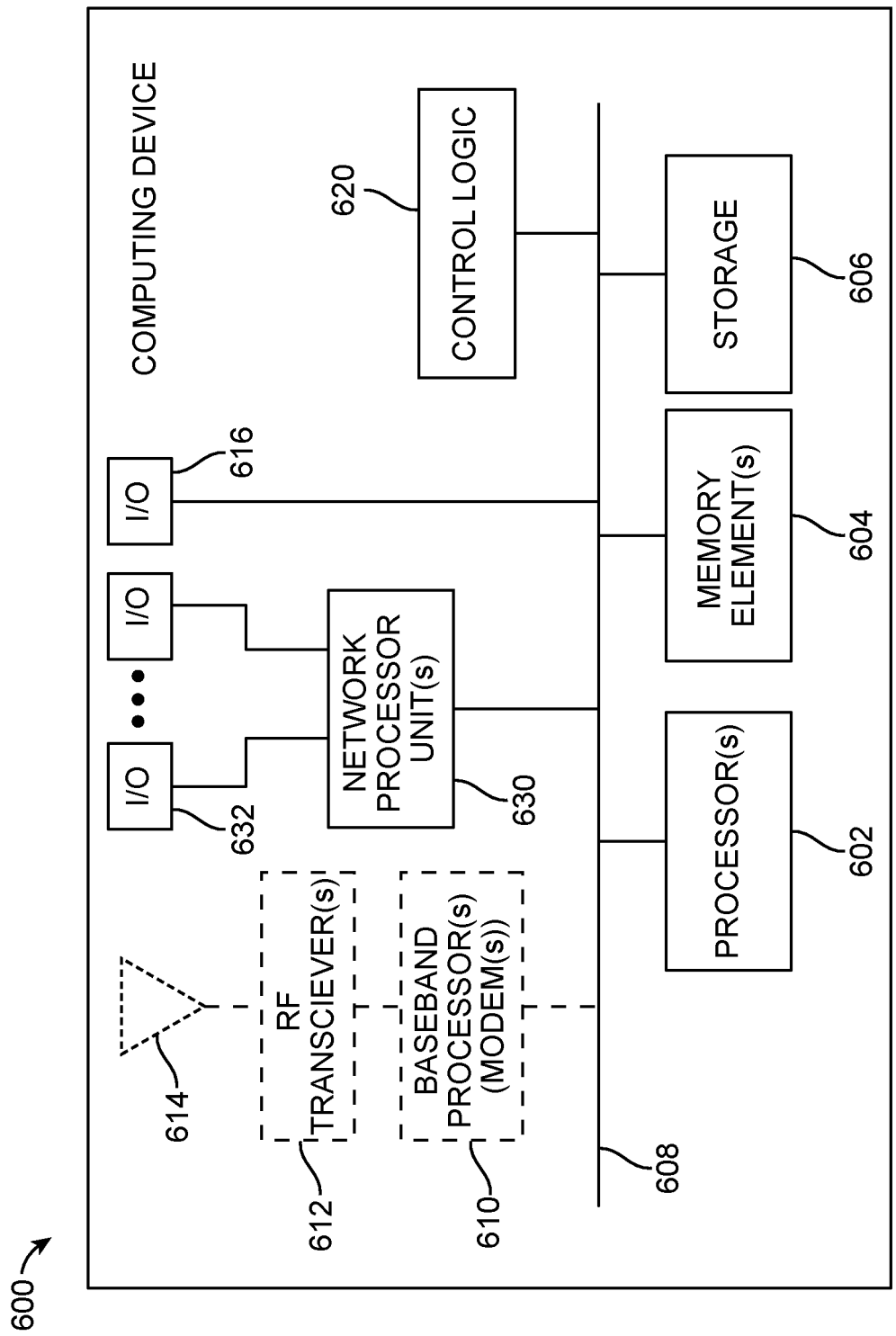
FIG. 6 is a hardware block diagram of a computing device that may perform functions associated with any combination of operations, in connection with the techniques discussed herein.

Referring to FIG. 6, FIG. 6 illustrates a hardware block diagram of a computing device 600 that may perform functions associated with operations discussed herein. In various embodiments, a computing device or apparatus, such as computing device 600 or any combination of computing devices 600, may be configured as any entity/entities as discussed herein in order to perform operations of the various techniques discussed herein.

In at least one embodiment, computing device 600 may be any apparatus that may include one or more processor(s) 602, one or more memory element(s) 604, storage 606, a bus 608, one or more I/O interface(s) 616, control logic 620, one or more one network processor unit(s) 630 and one or more network I/O interface(s) 632. In various embodiments, instructions associated with logic for computing device 600 can overlap in any manner and are not limited to the specific allocation of instructions and/or operations described herein.

For embodiments in which computing device 600 may be implemented as a UE, a radio node/access network radio (e.g., gNodeB, etc.), or any other device capable of wireless communications, computing device 600 may further include at least one baseband processor or modem 610, one or more radio RF transceiver(s) 612, one or more antenna(s) or antenna array(s) 614.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa) or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that are configured for computing device 600. In at least one embodiment, bus 608 is implemented as a fast kernel-hosted interconnect, potentially using shared memory between processes (e.g., logic), which can enable efficient communication paths between the processes.

Network processor unit(s) 630 may enable communication between computing device 600 and other systems, devices, or entities, via network I/O interface(s) 632 (wired and/or wireless) to facilitate operations discussed for various embodiments described herein. In various embodiments, network processor unit(s) 630 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 600 and other systems, devices, or entities to facilitate operations for various embodiments described herein. In various embodiments, network I/O interface(s) 632 can be configured as one or more Ethernet port(s), Fibre Channel ports, any other I/O port(s), and/or antenna(s)/antenna array(s) now known or hereafter developed. Thus, the network processor unit(s) 630 and/or network I/O interface(s) 632 may include suitable interfaces for receiving, transmitting, and/or otherwise communicating data and/or information (wired and/or wirelessly) in a network environment.

I/O interface(s) 616 allow for input and output of data and/or information with other entities that are connected to computing device 600. For example, I/O interface(s) 616 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 600 supports a display having touch-screen display capabilities.

For embodiments in which computing device 600 is implemented as a UE, a radio node/access network radio (e.g., gNodeB, etc.), or any other apparatus capable of wireless communications, the RF transceiver(s) 612 may perform RF transmission and RF reception of wireless signals via antenna(s)/antenna array(s) 614, and the baseband processor (modem) 610 performs baseband modulation and demodulation, etc. associated with such signals to enable wireless communications for computing device 600.

In various embodiments, control logic 620 can include instructions that, when executed, cause processor(s) 602 to perform operations, which can include, but not be limited to, providing overall control operations of computing device 600; interacting with other entities, elements, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620 of computing device 600) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 604 of computing device 600) and/or storage (e.g., storage 606 of computing device 600) can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include determining, via a first session of a user equipment, that the user equipment seeks to access content in which financial sponsorship for accessing the content by the user equipment is to be provided by a sponsoring entity, wherein the first session is provided via a first network slice; and based on the determining, enabling the user equipment to establish a second session to access the content, wherein the second session is provided via a second network slice that is different than the first network slice.

In one instance, the first session and the second session are provided contemporaneously for the user equipment. The user equipment does not have a subscription to connect to the second network slice.

The determining and the enabling can be performed by an application function of a mobile network. In one instance, the determining comprises intercepting, by a user plane function associated with the first session of the user equipment, a Domain Name System (DNS) query initiated by the user equipment; and providing, by a session management function associated with the first session, an indication to the application function indicating that the user equipment seeks to access the content. The indication can include sponsored data slice information associated with the second session.

The enabling can include providing, via the first session, a user equipment (UE) route selection policy (URSP) rule to the user equipment in which the URSP rule enables the user equipment to establish the second session via the second network slice. The enabling can include providing an indication to the user equipment that the user equipment is not responsible for financial sponsorship for accessing the content. In one instance, upon determining that the user equipment is to release the second session, the method includes triggering a disconnect for the user equipment, wherein the triggering includes providing a session disconnect reason indicator indicating that the second session is associated with sponsored data connectivity that causes removal of the URSP rule at the user equipment.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   determining, via a first session of a user equipment, that the user equipment seeks to access content in which financial sponsorship for accessing the content by the user equipment is to be provided by a sponsoring entity, wherein the first session is provided via a first network slice; and
   based on the determining, enabling the user equipment to establish a second session to access the content, wherein the second session is provided via a second network slice that is different than the first network slice.

2. The method of claim 1, wherein the first session and the second session are provided contemporaneously for the user equipment.

3. The method of claim 1, wherein the user equipment does not have a subscription to connect to the second network slice.

4. The method of claim 1, wherein the determining and the enabling are performed by an application function of a mobile network.

5. The method of claim 4, wherein the determining comprises:
   intercepting, by a user plane function associated with the first session of the user equipment, a Domain Name System (DNS) query initiated by the user equipment; and
   providing, by a session management function associated with the first session, an indication to the application function indicating that the user equipment seeks to access the content.

6. The method of claim 5, wherein the indication includes sponsored data slice information associated with the second session.

7. The method of claim 1, wherein the enabling includes providing, via the first session, a user equipment (UE) route selection policy (URSP) rule to the user equipment in which the URSP rule enables the user equipment to establish the second session via the second network slice.

8. The method of claim 7, wherein the enabling includes providing an indication to the user equipment that the user equipment is not responsible for financial sponsorship for accessing the content.

9. The method of claim 7, further comprising:
   upon determining that the user equipment is to release the second session, triggering a disconnect for the user equipment, wherein the triggering includes providing a session disconnect reason indicator indicating that the second session is associated with sponsored data connectivity that causes removal of the URSP rule at the user equipment.

10. One or more non-transitory computer readable storage media encoded with instructions that, when executed by a processor, cause the processor to perform operations, comprising:
- determining, via a first session of a user equipment, that the user equipment seeks to access content in which financial sponsorship for accessing the content by the user equipment is to be provided by a sponsoring entity, wherein the first session is provided via a first network slice; and
- based on the determining, enabling the user equipment to establish a second session to access the content, wherein the second session is provided via a second network slice that is different than the first network slice.

11. The media of claim 10, wherein the user equipment does not have a subscription to connect to the second network slice.

12. The media of claim 10, wherein the determining comprises:
- intercepting, by a user plane function associated with the first session of the user equipment, a Domain Name System (DNS) query initiated by the user equipment; and
- providing, by a session management function associated with the first session, an indication to an application function indicating that the user equipment seeks to access the content.

13. The media of claim 10, wherein the enabling includes providing, via the first session, a user equipment (UE) route selection policy (URSP) rule to the user equipment in which the URSP rule enables the user equipment to establish the second session via the second network slice.

14. The media of claim 13, wherein the enabling includes providing an indication to the user equipment that the user equipment is not responsible for financial sponsorship for accessing the content.

15. A system comprising:
- at least one memory element for storing data; and
- at least one processor for executing instructions associated with the data, wherein executing the instructions causes the system to perform operations, comprising:
  - determining, via a first session of a user equipment, that the user equipment seeks to access content in which financial sponsorship for accessing the content by the user equipment is to be provided by a sponsoring entity, wherein the first session is provided via a first network slice; and
  - based on the determining, enabling the user equipment to establish a second session to access the content, wherein the second session is provided via a second network slice that is different than the first network slice.

16. The system of claim 15, wherein the user equipment does not have a subscription to connect to the second network slice.

17. The system of claim 15, wherein the determining and the enabling are performed by an application function of a mobile network.

18. The system of claim 17, wherein the determining comprises:
- intercepting, by a user plane function associated with the first session of the user equipment, a Domain Name System (DNS) query initiated by the user equipment; and
- providing, by a session management function associated with the first session, an indication to the application function indicating that the user equipment seeks to access the content.

19. The system of claim 15, wherein the enabling includes providing, via the first session, a user equipment (UE) route selection policy (URSP) rule to the user equipment in which the URSP rule enables the user equipment to establish the second session via the second network slice.

20. The system of claim 19, wherein the enabling includes providing an indication to the user equipment that the user equipment is not responsible for financial sponsorship for accessing the content.

* * * * *